United States Patent
Chu et al.

(10) Patent No.: US 10,989,167 B2
(45) Date of Patent: Apr. 27, 2021

(54) KINETIC ENERGY HARVESTING MECHANISM

(71) Applicants: Southern Taiwan University of Science and Technology, Tainan (TW); HORNLING INDUSTRIAL INC., Tainan (TW)

(72) Inventors: Chia-Chun Chu, Tainan (TW); Liang Hsiung Wang, Tainan (TW); Yan-Yi Li, Tainan (TW)

(73) Assignees: SOUTHERN TAIWAN UNIVERSITY OF SCIENCE AND TECHNOLOGY, Tainan (TW); HORNLING INDUSTRIAL INC., Tainan (TW)

( * ) Notice: Subject to any disclaimer, the term of this patent is extended or adjusted under 35 U.S.C. 154(b) by 144 days.

(21) Appl. No.: 16/416,550

(22) Filed: May 20, 2019

(65) Prior Publication Data
US 2020/0109696 A1  Apr. 9, 2020

(30) Foreign Application Priority Data
Oct. 4, 2018 (TW) .................................. 107135090

(51) Int. Cl.
*F03D 7/02* (2006.01)
*F03D 13/20* (2016.01)
(Continued)

(52) U.S. Cl.
CPC .......... *F03D 7/0212* (2013.01); *F03D 1/065* (2013.01); *F03D 7/0224* (2013.01); *F03D 13/20* (2016.05);
(Continued)

(58) Field of Classification Search
CPC ........ F03D 7/0212; F03D 80/70; F03D 80/88; F16H 3/145; F16H 3/60; F16H 2712/06;
(Continued)

(56) References Cited

U.S. PATENT DOCUMENTS

| 4,291,233 A * | 9/1981 | Kirschbaum ........ H02K 16/005 |
| | | 290/1 C |
| 4,311,435 A * | 1/1982 | Bergero ................ F03D 7/0204 |
| | | 416/170 R |

(Continued)

FOREIGN PATENT DOCUMENTS

| CN | 104421382 A | 3/2015 |
| CN | 106523265 | 3/2017 |

(Continued)

OTHER PUBLICATIONS

European Search Report in related EPC patent application EP19183773 dated Jan. 17, 2020.

*Primary Examiner* — Woody A Lee, Jr.
*Assistant Examiner* — Brian O Peters
(74) *Attorney, Agent, or Firm* — WPAT, PC

(57) ABSTRACT

A kinetic energy harvesting mechanism has a fixing shaft, a rotating shell, an input member, and a fixing shaft driving assembly. The rotating shell is disposed on the fixing shaft. The input member is axially connected to the fixing shaft. The fixing shaft driving assembly is disposed in the rotating shell and has a first one-way bearing, a second one-way bearing, a first driving member, a second driving member, and a third driving member. Unidirectional transmission functions of the first one-way bearing and the second one-way bearing are adverse to each other. The first driving member is disposed in the rotating shell by the first one-way bearing. The second driving member is disposed in the rotating shell by the second one-way bearing. The third driving member is disposed in the rotating shell and is connected to the first driving member and the second driving member.

28 Claims, 18 Drawing Sheets

(51) Int. Cl.

| | | |
|---|---|---|
| *F03D 80/70* | (2016.01) | |
| *F16H 3/14* | (2006.01) | |
| *F16H 3/60* | (2006.01) | |
| *F16H 48/08* | (2006.01) | |
| *F16H 48/20* | (2012.01) | |
| *F03D 80/80* | (2016.01) | |
| *F03D 1/06* | (2006.01) | |

(52) U.S. Cl.
CPC ............. *F03D 80/70* (2016.05); *F03D 80/88* (2016.05); *F05B 2270/402* (2013.01)

(58) Field of Classification Search
CPC .... F16H 48/08; F16H 48/10; F16H 2048/082; F16H 2048/085; F16H 2048/087; F16H 2048/202; F16H 2048/204; F05B 2260/4031; F05B 2260/40312; F05B 2260/5032

See application file for complete search history.

(56) References Cited

U.S. PATENT DOCUMENTS

| | | | |
|---|---|---|---|
| 8,836,158 B2 * | 9/2014 | Cho | ........................ F03D 9/25 290/55 |
| 2012/0183402 A1 | 7/2012 | Bortoli | |
| 2013/0186223 A1 | 7/2013 | Bennstedt | |
| 2013/0277971 A1 | 10/2013 | Cho et al. | |

FOREIGN PATENT DOCUMENTS

| | | |
|---|---|---|
| CN | 106523265 A | 3/2017 |
| JP | S6312887 | 1/1988 |

* cited by examiner

KINETIC ENERGY HARVESTING MECHANISM

This application claims the benefit of Taiwan patent application No. 107135090, filed on Oct. 4, 2018.

BACKGROUND OF THE INVENTION

1. Field of the Invention

The present invention relates to a kinetic energy harvesting mechanism, and more particularly to a kinetic energy harvesting mechanism is a biaxial kinetic energy harvesting mechanism and is applied to capture the unstable kinetic energy.

2. Description of Related Art

Wind power equipment can be disposed at an urbanized area or an unstable wind field area. In much power generation equipment, small wind power generation equipment has the advantages of small size and large flexibility in installation site. Many research teams invest in the development of the small wind power generation equipment. However, the small wind power generation equipment is susceptible to terrain, wind direction, and turbulence. Thus, in some small wind power generation equipment, a chasing structure is disposed on a fan of the small wind power generation equipment for guiding an impeller of the fan to face the wind to capture maximum wind energy.

However, a conventional small horizontal-axis wind energy device only captures the wind energy density generated by the wind velocity and cannot capture the steering kinetic energy generated by the fin chasing the wind. The steering kinetic energy of the fin is wasted. The change of the wind direction is one of the important factors about decreasing the efficiency of the conventional small horizontal-axis wind energy device. A conventional small vertical-axis wind energy device cannot be influenced by the change of the wind direction, but the efficiency of the conventional small vertical-axis wind energy device is lower than the efficiency of the conventional small horizontal-axis wind energy device.

Furthermore, the installation site of the small wind energy device is close to the Earth's surface. The small wind energy device is hard to work steadily and captures the wind energy effectively. For suiting the change of the wind direction, the small horizontal-axis wind energy device can be implemented with an active chasing structure and a passive chasing structure. The active chasing structure consumes an extra energy. The passive chasing structure cannot capture the wind immediately and wastes the wind energy generated by the change of the wind direction. The passive chasing structure needs to be improved. The passive chasing structure can use the wind energy for adjusting a wind turbine to face the wind automatically. The oscillating motion of the wind turbine has an available kinetic energy. The small wind energy device and the passive chasing structure do not have any auxiliary kinetic energy utilization mechanism, so the steering kinetic energy of the fin is wasted.

In addition, a generating unit of the small horizontal-axis wind energy device follows the chasing structure to oscillate by a brush or a rotating connector for transferring the electric power to a wire located in the fixed shaft. Inertia is increased by the oscillation of the generating unit. The small horizontal-axis wind energy device cannot capture the wind sensitively. Furthermore, the brush or the rotating connector increases the cost of the equipment, decreases the service life of the equipment, and reduces the electrical energy transmission efficiency.

To overcome the shortcomings, the present invention provides a kinetic energy harvesting mechanism to mitigate or obviate the aforementioned problems.

SUMMARY OF THE INVENTION

The objective of the invention is to provide a kinetic energy harvesting mechanism that can solve the problems that the kinetic energy sources of the conventional wind energy device are unstable, and the conventional wind energy device captures the kinetic energy inefficiently.

The kinetic energy harvesting mechanism has a fixing shaft, a rotating shell, an input member, and a fixing shaft driving assembly. The fixing shaft is disposed uprightly. The rotating shell is hollow, is disposed on the fixing shaft, and is able to rotate relative to the fixing shaft. The input member is pivotally disposed in the rotating shell and is axially connected to the fixing shaft. The fixing shaft driving assembly is disposed in the rotating shell and has a first one-way bearing, a second one-way bearing, a first driving member, a second driving member, and a third driving member.

The first one-way bearing is disposed in the rotating shell. The second one-way bearing is disposed in the rotating shell. A rotating driving direction of the second one-way bearing is contrary to a rotating driving direction of the first one-way bearing.

The first driving member is connected to the first one-way bearing to be disposed in the rotating shell. The fixing shaft is inserted through the first driving member. The rotating shell drives the first driving member by the first one-way bearing. The first driving member is rotated in a rotating direction of the fixing shaft.

The second driving member is connected to the second one-way bearing to be disposed in the rotating shell and is coaxially disposed with the first driving member at a spaced interval. The fixing shaft is inserted through the second driving member. The rotating shell drives the second driving member by the second one-way bearing. The second driving member is rotated in a rotating direction of the fixing shaft. The rotating direction of the second driving member is contrary to the rotating direction of the first driving member.

The third driving member is disposed in the rotating shell and is connected to the first driving member and the second driving member. One of the first driving member, the second driving member, and the third driving member is connected to the input member. The input member drives the first driving member, the second driving member, and the third driving member to move simultaneously.

In the kinetic energy harvesting mechanism, six parts, which are the fixing shaft, the rotating shell, the input member, the first driving member, the second driving member, and the third driving member, are utilized to form a combined transmission structure. The input member and the fixing shaft axially intersected to each other are input parts of kinetic energy. One of the first driving member, the second driving member, and the third driving member is connected to the input member for transmitting movement. The third driving member transmits movement between the first driving member and the second driving member. One of the first driving member, the second driving member, and the third driving member serves as an output of kinetic energy. The first driving member is connected to the first one-way bearing to be disposed in the rotating shell. The second driving member is connected to the second one-way bearing to be disposed in the rotating shell. The rotating driving direction of the second one-way bearing is contrary to the rotating driving direction of the first one-way bearing. Unidirectional transmission functions of the first one-way bearing and the second one-way bearing are adverse to each other.

The operation of the kinetic energy harvesting mechanism cannot be interfered by the first one-way bearing and the second one-way bearing. The kinetic energy harvesting mechanism has five revolute pairs and three driving wheel pairs to form a biaxial kinetic energy harvesting mechanism having two degrees of freedom. A combination structure of the kinetic energy harvesting mechanism integrates biaxial input kinetic energy in a tandem way. The kinetic energy harvesting mechanism has a good capture property for capturing the unstable kinetic energy.

The kinetic energy harvesting mechanism in accordance with the present invention is applied as a wind power harvesting mechanism and has the following advantages:

1. The rotating shaft of the input member is connected to a fan wheel for capturing fluid power, such as wind power. The kinetic energy is transmitted and is outputted by the input member and the fixing shaft driving assembly. The rotating shell can be rotated by wind. The kinetic energy harvesting mechanism has a chasing wind function. When the kinetic energy harvesting mechanism chases the wind, the rotating shell can be clockwise or counterclockwise rotated by the wind. The rotating kinetic energy can be transmitted to an output shaft by the fixing shaft driving assembly.

2. The kinetic energy generated by the rotating shaft in rotating and the kinetic energy generated by the rotating shell in chasing are captured by the kinetic energy harvesting mechanism simultaneously. The kinetic energy harvesting mechanism has a structure having two degrees of freedom for having and integrating mechanical energy with vertical and horizontal biaxial inputs to a single axial direction rotated continuously. Total wind power capturing capacity is increased. The kinetic energy harvesting mechanism is a wind power harvesting mechanism being innovative and having industrial applicability.

3. The kinetic energy harvesting mechanism has a combination structure with the rotating shell and the fixing shaft driving assembly for capturing the kinetic energy with two-way chase. The first driving member is connected to the first one-way bearing to be disposed in the rotating shell. The second driving member is connected to the second one-way bearing to be disposed in the rotating shell. The second driving member is coaxially disposed with the first driving member at a spaced interval. The third driving member is connected to the first driving member and the second driving member for transmitting movement. Unidirectional transmission functions of the first one-way bearing and the second one-way bearing are adverse to each other. The operation of the kinetic energy harvesting mechanism cannot be interfered by the first one-way bearing and the second one-way bearing. The influence of the backflow work can be decreased by the speed ratios of the first driving member, the second driving member, and the third driving member.

4. The input kinetic energy of the input member and the input kinetic energy of the rotating shell are transmitted to an output member pivotally disposed on the fixing shaft by a transmitting mechanism for outputting the continuous rotating kinetic energy. When the kinetic energy harvesting mechanism is applied as a wind power generation mechanism, a generating unit can be disposed on the fixing shaft without a brush or a rotating connecter for reducing a moment of inertia in chasing time, reducing the cost, increasing the service life, and keeping the electrical energy transmission efficiency.

5. The kinetic energy harvesting mechanism can be applied as a small wind power generation device. The kinetic energy harvesting mechanism can capture the chasing rotating kinetic energy. The input member can be driven by the wind for a long time for working. The kinetic energy generated by the rotating shaft driven by the wind and the kinetic energy generated by the rotating shell chasing are captured by the kinetic energy simultaneously. Total energy chased and captured is considerable. When the kinetic energy harvesting mechanism is applied as a small wind power generation device, the generating unit is disposed on the fixing shaft, and the installation site can be close to the Earth's surface, the city, and disorderly wind field for capturing a lot of the kinetic energy.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
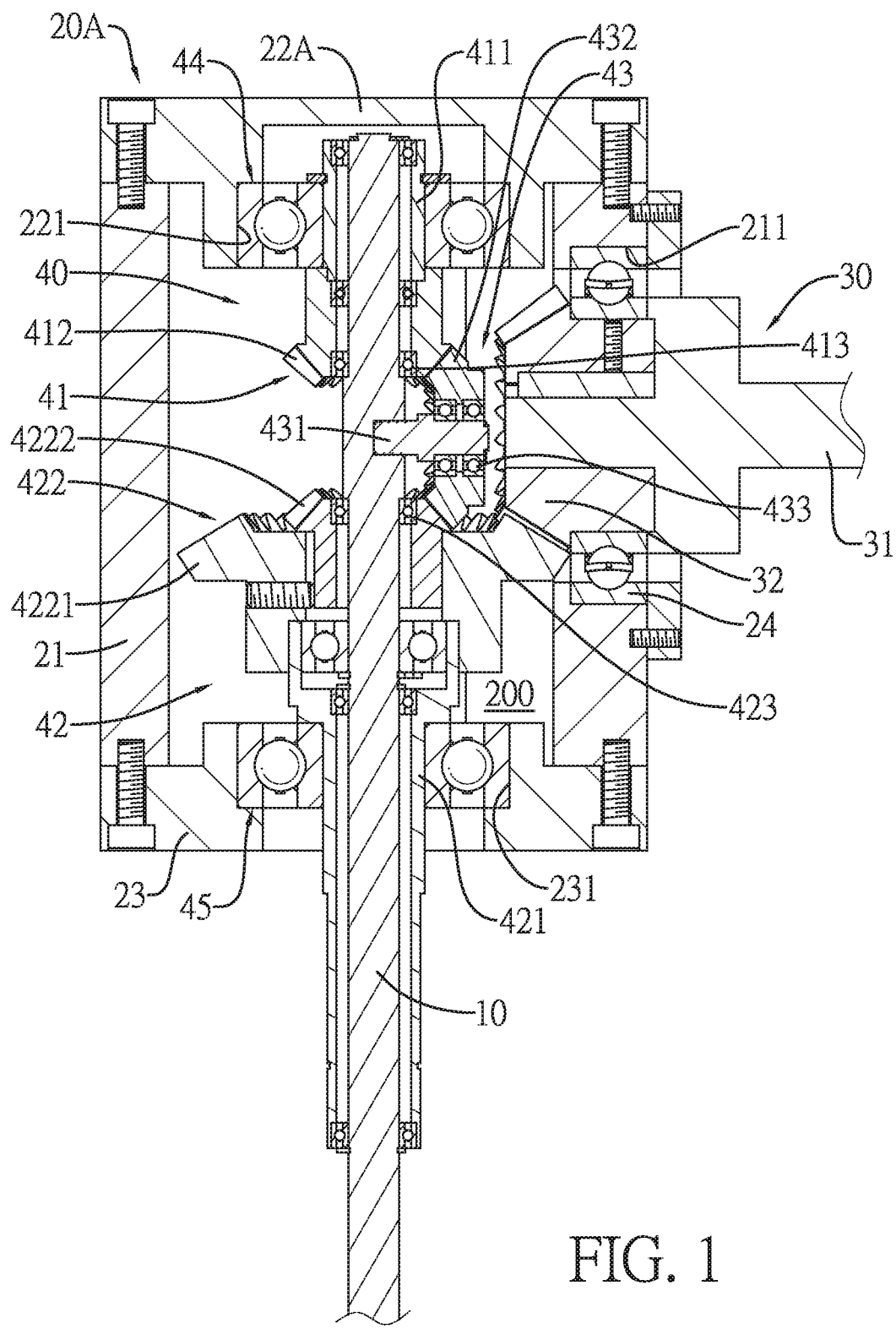
FIG. 1 is a side view in partial section of a first embodiment of a kinetic energy harvesting mechanism in accordance with the present invention.

With reference to FIGS. 1 to 4, a first embodiment, a second embodiment, and a third embodiment of a kinetic energy harvesting mechanism in accordance with the present invention each comprise a fixing shaft 10, a rotating shell 20A, 20B, an input member 30, and a fixing shaft driving assembly 40. When fluid flows through the kinetic energy harvesting mechanism, the kinetic energy harvesting mechanism can capture fluid power, such as wind power or water power.

With reference to FIGS. 1 to 4, the fixing shaft 10 is disposed uprightly in a vertical direction and is fixed for providing a necessary supporting force for the kinetic energy harvesting mechanism.

The rotating shell 20A, 20B is hollow, is disposed on the fixing shaft 10, is able to clockwise or counterclockwise rotate relative to the fixing shaft 10, and has a surrounding wall 21, a chamber 200, a top plate 22A, 22B, and a bottom plate 23. The surrounding wall 21 is disposed around the fixing shaft 10 and has a top edge and a bottom edge. The chamber 200 is formed in the surrounding wall 21. The top plate 22A, 22B is disposed on the top edge of the surrounding wall 21. The bottom plate 23 is disposed on the bottom edge of the surrounding wall 21.

Figure 2:
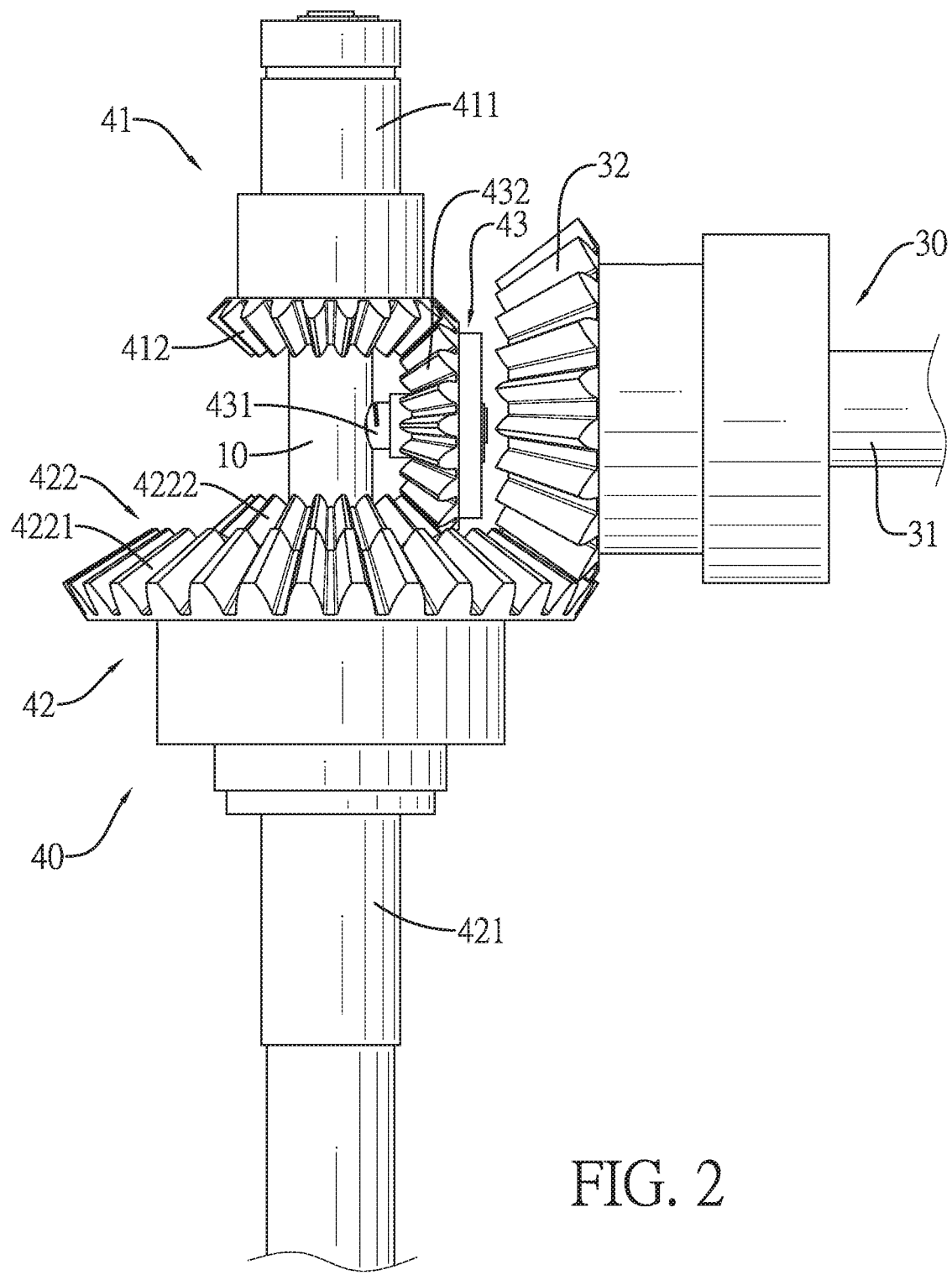
FIG. 2 is a side view of the kinetic energy harvesting mechanism in FIG. 1, showing a fixing shaft, a fixing shaft driving assembly, and an input member of the kinetic energy harvesting mechanism are connected to each other.
Figure 3:
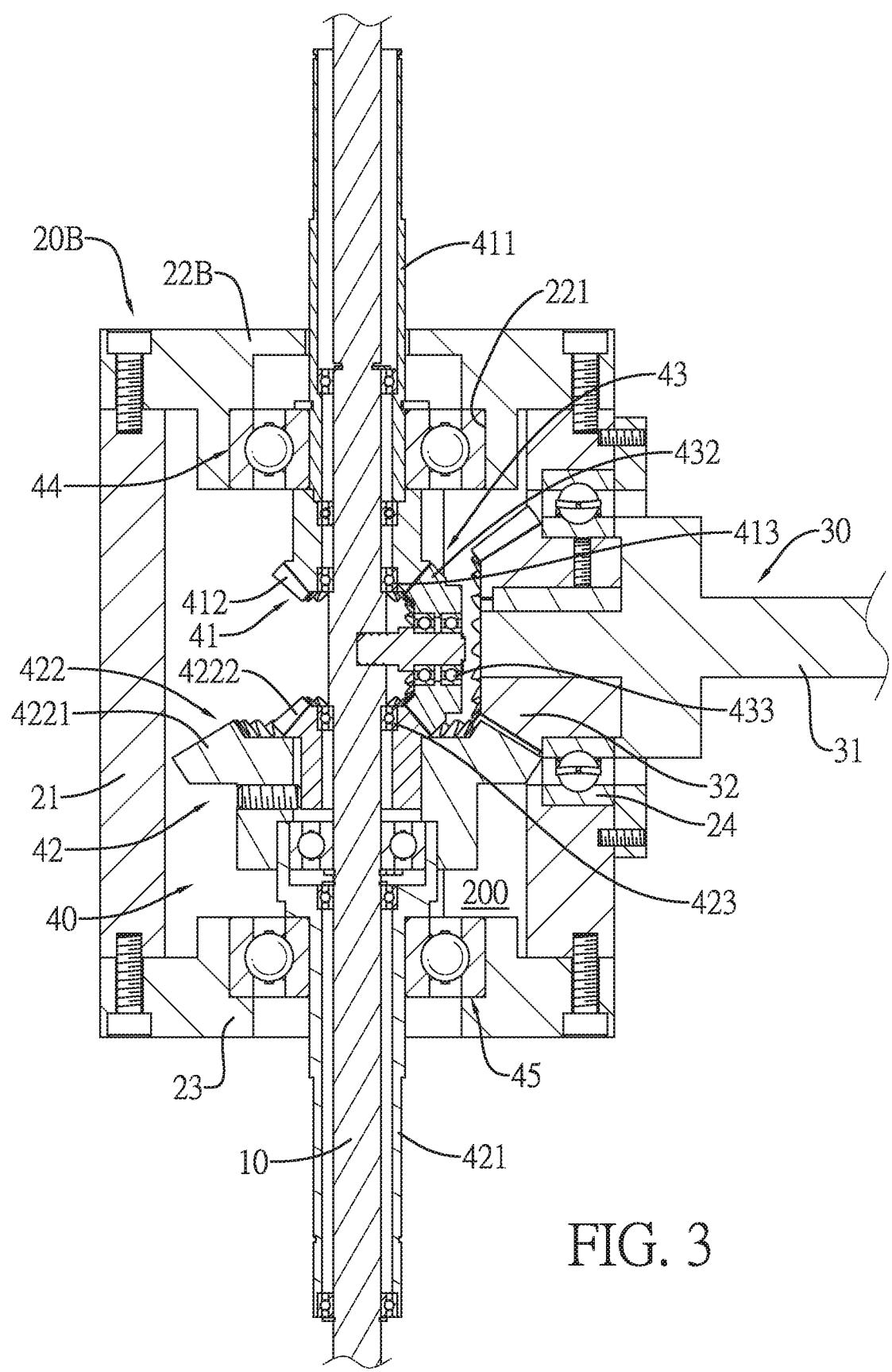
FIG. 3 is a side view in partial section of a second embodiment of a kinetic energy harvesting mechanism in accordance with the present invention.

The rotating shell 20A, 20B has a bottom hole 231 and a side hole 211. The bottom hole 231 is formed on a center of the bottom plate 23 and is in communication with the chamber 200. The fixing shaft 10 is inserted into the chamber 200 via the bottom hole 231 on the bottom plate 23. The side hole 211 is formed on a side surface of the surrounding wall 21 and is in communication with the chamber 200. With reference to FIGS. 1 and 2, the rotating shell 20A, 20B has a top hole 221. The top hole 221 is formed on a center of the top plate 22A, 22B and is in communication with the chamber 200. The top hole 221 can be located on a bottom of the top plate 22A and does not extend to a top surface of the top plate 22A. With reference to FIG. 3, the top hole 221 is a through hole and is formed through the top plate 22B. A top section of the fixing shaft 10 is inserted through the top hole 221 on the top plate 22B and protrudes out of the top surface of the rotating shell 20B.

With reference to FIGS. 1 to 4, the input member 30 is pivotally disposed in the rotating shell 20A, 20B and is axially connected to the fixing shaft 10. The input member 30 has a rotating shaft 31 and a rotating wheel 32. The rotating shaft 31 is pivotally disposed in the rotating shell 20A, 20B. An axial direction of the rotating shaft 31 intersects with an axial direction of the fixing shaft 10. The rotating shaft 31 is pivotally disposed on the rotating shell 20A, 20B horizontally or substantially horizontally. The axial direction of the rotating shaft 31 in the horizontal direction intersects with the axial direction of the fixing shaft 10 in the vertical direction. The rotating shaft 31 is pivotally disposed in the side hole 211 on the surrounding wall 21 of the rotating shell 20A, 20B. At least one fourth bearing 24 is disposed between a wall adjacent to the side hole 211 and the rotating shaft 31. The rotating shaft 31 can be rotated in the rotating shell 20A, 20B. The rotating shaft 31 follows the rotating shell 20A, 20B to rotate around the fixing shaft 30. The rotating wheel 32 is located in the chamber 200 of the rotating shell 20A, 20B and is fixed on an end of the rotating shaft 31. Another end of the rotating shaft 31 is extended out of the rotating shell 20A, 20B and is connected to an external rotating mechanism.

With reference to FIGS. 1 to 4, the fixing shaft driving assembly 40 is disposed in the rotating shell 10, is located in the rotating shell 20A, 20B, is connected to the input member 30, and has a first one-way bearing 44, a second one-way bearing 45, a first driving member 41, a second driving member 42, and a third driving member 43, 43C. The first one-way bearing 44 is disposed in the rotating shell 20A, 20B. The second one-way bearing 45 is disposed in the rotating shell 20A, 20B. A rotating driving direction of the second one-way bearing 45 is contrary to a rotating driving direction of the first one-way bearing 44. Unidirectional transmission functions of the first one-way bearing 44 and the second one-way bearing 45 are adverse to each other. The first one-way bearing 44 is a bearing having a counter-clockwise rotating transmitting function. The second one-way bearing 45 is a bearing having a clockwise rotating transmitting function.

The first driving member 41 is connected to the first one-way bearing 44 to be disposed in the rotating shell 20A, 20B. The fixing shaft 10 is inserted through the first driving member 41. The rotating shell 20A, 20B drives the first driving member 41 by the first one-way bearing 44. The first driving member 41 is rotated in a rotating direction of the fixing shaft 10. The second driving member 42 is connected to the second one-way bearing 45 to be disposed in the rotating shell 20A, 20B and is coaxially disposed with the first driving member 41 at a spaced interval. The fixing shaft 10 is inserted through the second driving member 42. The rotating shell 20A, 20B drives the second driving member 42 by the second one-way bearing 45. The second driving member 42 is rotated in a rotating direction of the fixing shaft 10. The rotating direction of the second driving member 42 is contrary to the rotating direction of the first driving member 41.

The third driving member 43 is disposed in the chamber 200 of the rotating shell 20A, 20B, and is connected to the first driving member 41 and the second driving member 42 for transmitting movement. One of the first driving member 41 and the second driving member 42 is connected to the rotating wheel 32 of the input member 30 for transmitting movement. When the input member 30 is set with a counterclockwise rotating direction for transmitting movement, the second driving member 42 is connected to the rotating wheel 32 of the input member 30 for transmitting movement, but it is not limited thereto.

With reference to FIGS. 1 to 4, the fixing shaft driving assembly 40 is further explained. For example, the rotating shell 20A, 20B is clockwise rotated, drives the first driving member 41 to rotate by the first one-way bearing 44, and cannot drive the second driving member 42 to rotate by the second one-way bearing 45. When the rotating shell 20A, 20B is counterclockwise rotated, the rotating shell 20A, 20B cannot drive the first driving member 41 to rotate by the first one-way bearing 44, but the rotating shell 20A, 20B can drive the second driving member 42 to rotate by the second one-way bearing 45. To avoid the movement interference of the fixing shaft driving assembly 40, the first driving member 41 and the second driving member 42 are coacted by the third driving member 43. One of the first driving member 41, the second driving member 42, and the third driving member 43 is connected to the input member 30 for transmitting movement. The input member 30 drives the fixing shaft driving assembly 40. The rotating shell 20A, 20B can be clockwise or counterclockwise rotated for driving the fixing shaft driving assembly 40 to integrate the mechanical energies inputted in two axial directions.

As for the structure of the fixing shaft driving assembly 40, with reference to FIGS. 1 to 4, the first driving member 41 has a first driving wheel 412 and further has a first driving tube 411. The first driving wheel 412 is fixedly connected to an end of the first driving tube 411. The first driving tube 411 is in conjunction with the first one-way bearing 44 to be disposed in the top hole 221 on the top plate 22A, 22B of the rotating shell 20A, 20B. The first driving wheel 412 is located in the chamber 200 of the rotating shell 20A, 20B. The fixing shaft 10 is inserted through the first driving tube 411 and the first driving wheel 412. At least one first bearing 413 is disposed between the fixing shaft 10 and the first driving member 41 for decreasing frictional resistance.

In the first driving member 41, the first driving tube 411 and the first driving wheel 412 are independent components. The first driving member 41 is a combined member with the first driving tube 411 and the first driving wheel 412, or the first driving wheel 412 is formed on the first driving tube 411. The first driving member 41 is an integrated member.

With reference to FIGS. 1 to 4, the second driving member 42 has a second driving wheel 422 and further has a second driving tube 421. The second driving wheel 422 is fixedly disposed on an end of the second driving tube 421. The second driving tube 421 is in conjunction with the second one-way bearing 45 to be disposed in the bottom hole 231 on the bottom plate 23 of the rotating shell 20A, 20B. The second driving wheel 422 is located in the chamber 200 of the rotating shell 20A, 20B. The first driving wheel 412 is opposite to the second driving wheel 422. The fixing shaft 10 is inserted through the second driving tube 421 and the second driving wheel 422. At least one second bearing 423 is disposed between the fixing shaft 10 and the second driving member 42 for decreasing frictional resistance. The second driving wheel 422 has a first wheel portion 4221 and a second wheel portion 4222. The first wheel portion 4221 is connected to the rotating wheel 32 of the input member 30. The second wheel portion 4222 is located in and is coaxially connected to the first wheel portion 4221.

In the second driving member 42, the second driving tube 421 and the second driving wheel 422 are independent components. The second driving member 42 is a combined member with the second driving tube 421 and the second driving wheel 422, or the second driving wheel 422 is formed on the second driving tube 421. The second driving member 42 is an integrated member.

With reference to FIGS. 1 to 4, the third driving member 43, 43C has an inner shaft 431, 431C and a third driving wheel 432, 432C. The inner shaft 431, 431C is horizontally disposed on the fixing shaft 10. An axial direction of the inner shaft 431, 431C intersects with the axial direction of the fixing shaft 10. The third driving wheel 432, 432C is disposed on an end of the inner shaft 431, 431C and is located out of the fixing shaft 10. At least one third bearing 433 is disposed between the third driving wheel 432, 432C and the inner shaft 431, 431C for decreasing frictional resistance. The third driving wheel 432, 432C is connected to the first driving wheel 412 and the second wheel portion 4222 of the second driving wheel 422 for transmitting movement.

Figure 4:
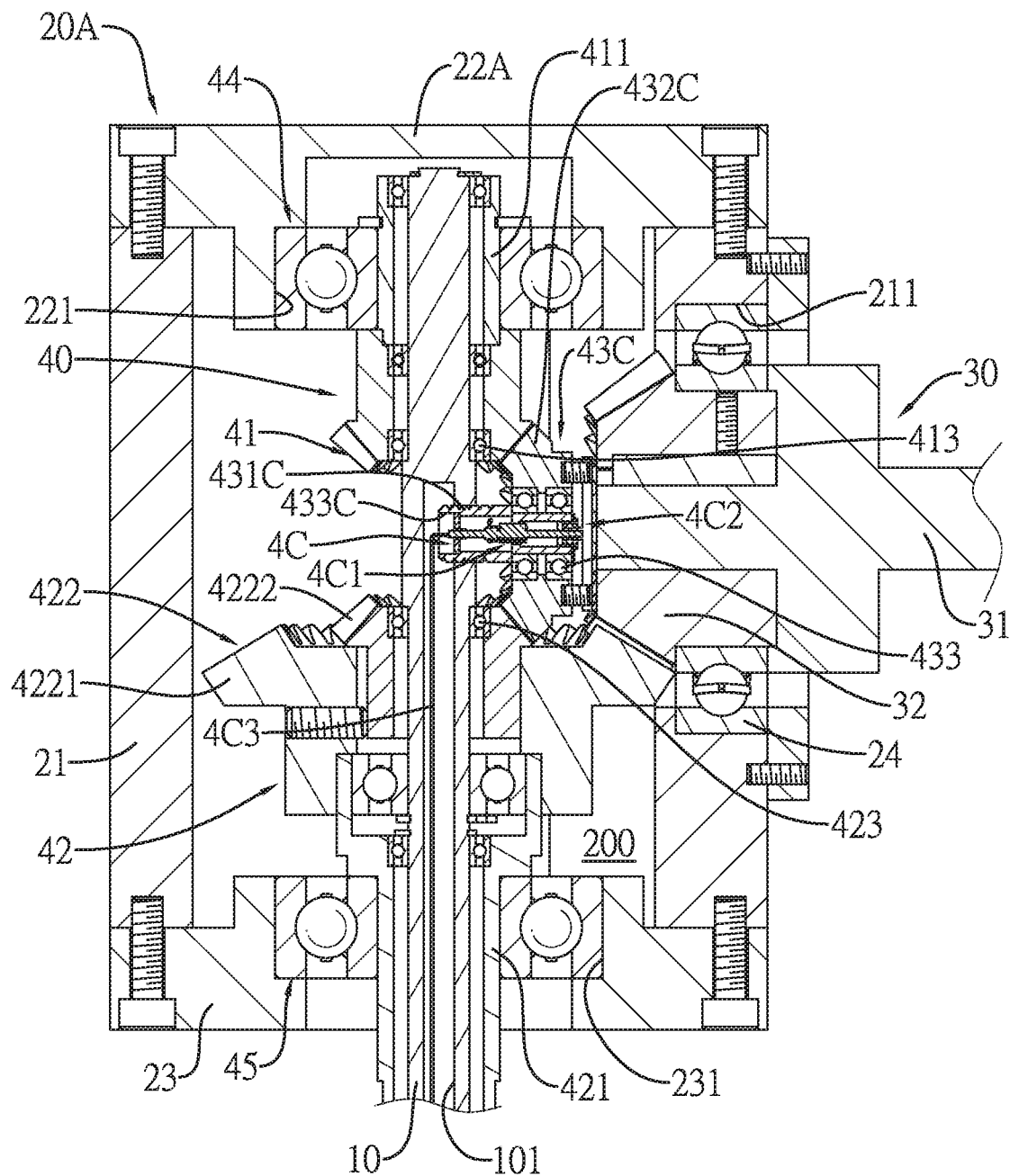
FIG. 4 is a side view in partial section of a third embodiment of a kinetic energy harvesting mechanism in accordance with the present invention.

With reference to FIG. 4, in the third embodiment of the present invention, an inner hole 433C is axially formed through the inner shaft 431C of the third driving member 43C. A wire hole 101 is formed in the fixing shaft 10, is in communication with the inner hole 433C, and extends to an outer surface of the fixing shaft 10. A generating set 4C is disposed in the third driving member 43C. An external wire connected to the generating set 4C is inserted into and out of the wire hole 101 of the fixing shaft 10.

With reference to FIGS. 1, 2, and 4, the first driving tube 411 of the first driving member 41 is not extended out of the top surface of the top plate 22A. With reference to FIG. 3, the first driving tube 411 is inserted through the top hole 221 of the top plate 22B and is extended out of the top surface of the top plate 22B.

The rotating wheel 32 of the input member 30 is a bevel gear or a friction wheel. With reference to FIGS. 1 to 3, when the rotating wheel 32 is a bevel gear, the first driving wheel 412, the first wheel portion 4221 and the second wheel portion 4222 of the second driving wheel 42, and the third driving wheel 432 are all bevel gears. The rotating wheel 32, the first driving wheel 412, the first wheel portion 4221 and the second wheel portion 4222 of the second driving wheel 422, and the third driving wheel 432 are in engaging relationships for transmitting movement. The bevel gears aforementioned can be replaced by friction wheels to achieve equivalent transmission performance.

The kinetic energy harvesting mechanism is an invention by means of a combined structure aforementioned. With reference to FIGS. 1 to 4, the kinetic energy harvesting mechanism adopts six parts of the fixing shaft 10, the first driving tube 411, the second driving tube 421, the rotating shell 20A, 20B, the rotating shaft 31, and the inner shaft 431. The rotating shaft 31 of the input member 30 and the rotating shell 20A, 20B are applied as input parts of kinetic energy. One of the first driving member 41, the second driving member 42, and the third driving member 43C is applied as an output part of kinetic energy. The kinetic energy harvesting mechanism uses two intersected axial directions and a series connection structure for integrating and outputting to a single axial direction continuously in rotation. The first driving tube 411 of the first driving member 41 is in conjunction with the first one-way bearing 44 to be disposed on a top section of the rotating shell 20A, 20B. The second driving tube 421 of the second driving member 42 is in conjunction with the second one-way bearing 45 to be disposed on a bottom section of the rotating shell 20A, 20B. The third driving member 43 is connected between the first driving member 41 and the second driving member 42 for transmitting movement. Unidirectional transmission functions of the first one-way bearing 44 and the second one-way bearing 45 are adverse to each other. The rotating motion of the kinetic energy harvesting mechanism cannot be interfered by the first one-way bearing 44 and the second one-way bearing 45.

In the combined structure aforementioned, the kinetic energy harvesting mechanism has five revolute pairs, three driving wheel pairs such as gear pairs or rolling pairs, and six rotating parts. The five revolute pairs include a first revolute pair, a second revolute pair, a third revolute pair, a fourth revolute pair, and a fifth revolute pair. The first revolute pair is located between the fixing shaft 10 and the second driving member 42. The second revolute pair is located between the fixing shaft 10 and the first driving member 41. The third revolute pair is located between the fixing shaft 10 and the third driving member 43. The fourth revolute pair is located between the rotating wheel 32 and the rotating shell 20A. The fifth revolute pair is located between the fixing shaft 10 and the rotating shell 20A. The three driving wheel pairs include a first gear pair, a second gear pair, and a third gear pair. The first gear pair is located between the rotating wheel 32 and the second driving member 42. The second gear pair is located between the second driving member 42 and the third driving member 43. The third gear pair is located between the first driving member 41 and the third driving member 43. In six rotating parts, two of the rotating parts are the input member 30 and the rotating shell 20A, 20B and are applied as the input parts of kinetic energy. One of the rotating parts is one of the first driving member 41, the second driving member 42, and the third driving member 43C and is applied as the output part of kinetic energy. A calculation formula of the degree of freedom F of the kinetic energy harvesting mechanism is as follows:

$$F=3\times(6-1)-2\times5-1\times3=2$$

Therefore, the kinetic energy harvesting mechanism has two degrees of freedom to form a biaxial kinetic energy harvesting mechanism. A combination structure of the kinetic energy harvesting mechanism integrates biaxial input kinetic energy in a tandem way. The kinetic energy harvesting mechanism has a good capture property for capturing the unstable kinetic energy.

The kinetic energy harvesting mechanism of the present invention is applicable to various harvesting mechanisms for capturing unstable kinetic energy. The kinetic energy harvesting mechanism is applied as a wind power generation mechanism. The kinetic energy harvesting mechanism can be realized by various means such as connecting an external generator set or connecting a built-in generator set.

Figure 5:
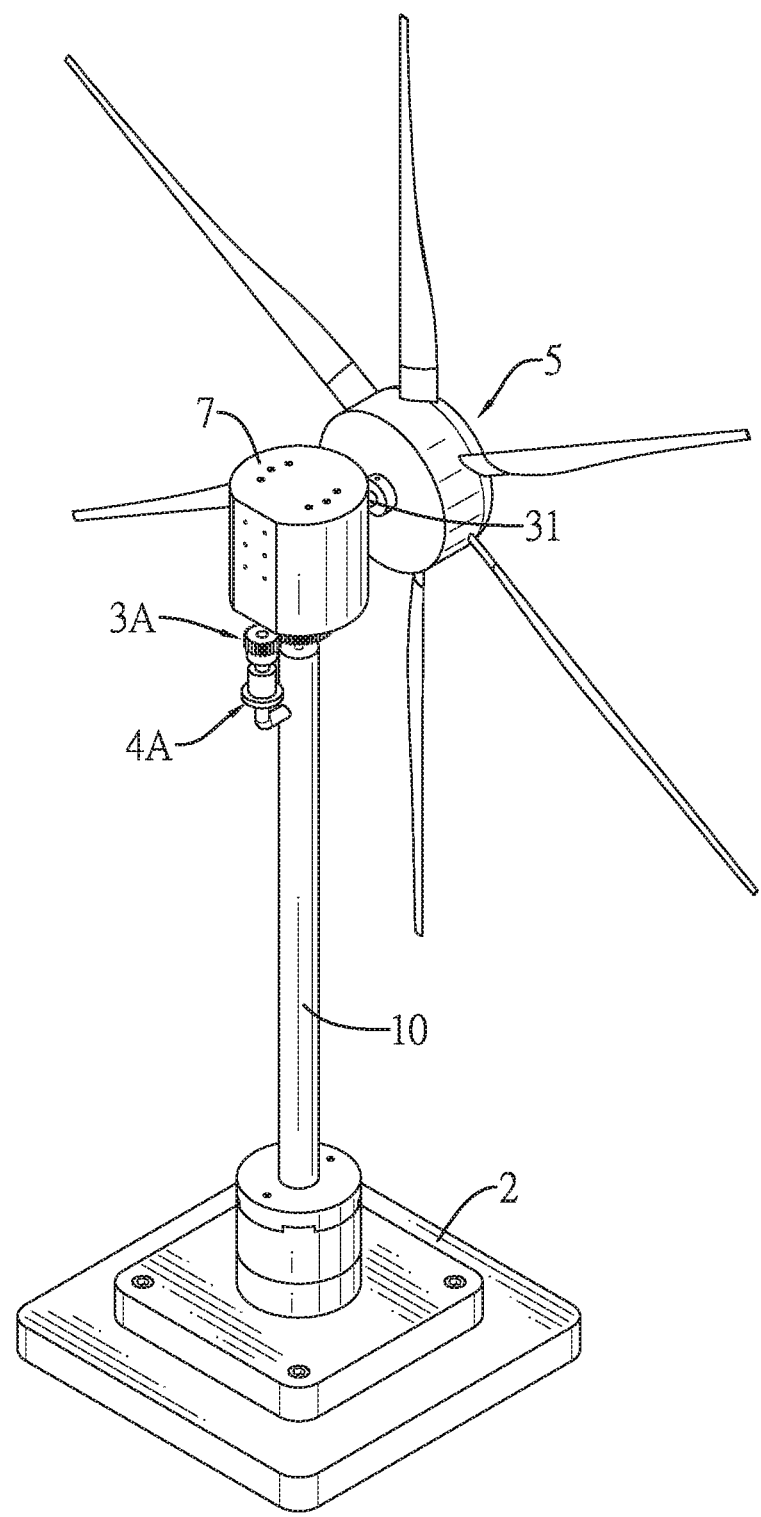
FIG. 5 is a perspective view of a first embodiment of a leeward wind power generation mechanism in accordance with the present invention, showing the kinetic energy harvesting mechanism is the leeward wind power generation mechanism.
Figure 7:
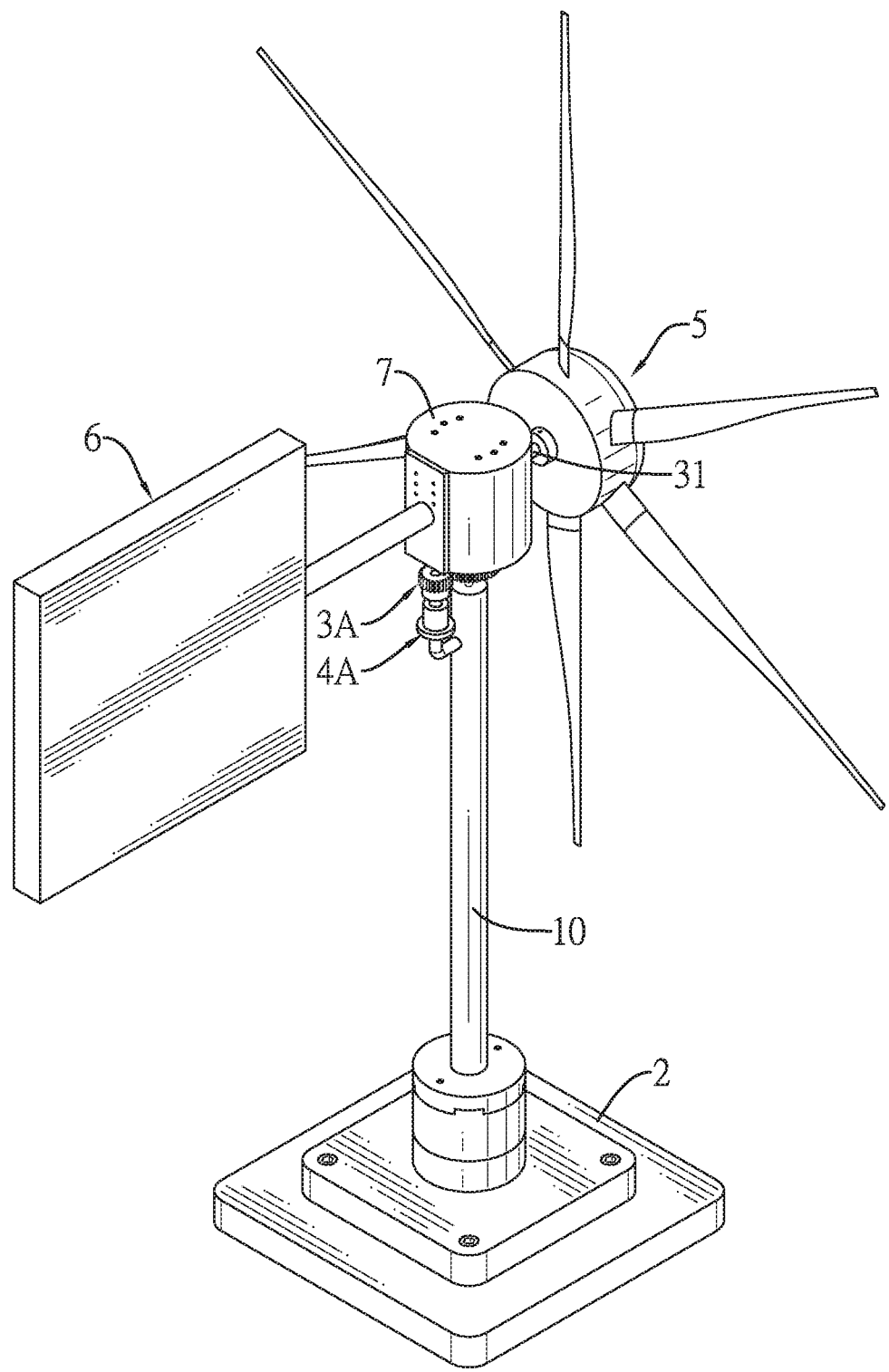
FIG. 7 is a perspective view of a first embodiment of a windward wind power generation mechanism in accordance with the present invention, showing the kinetic energy harvesting mechanism is the windward wind power generation mechanism.
Figure 9:
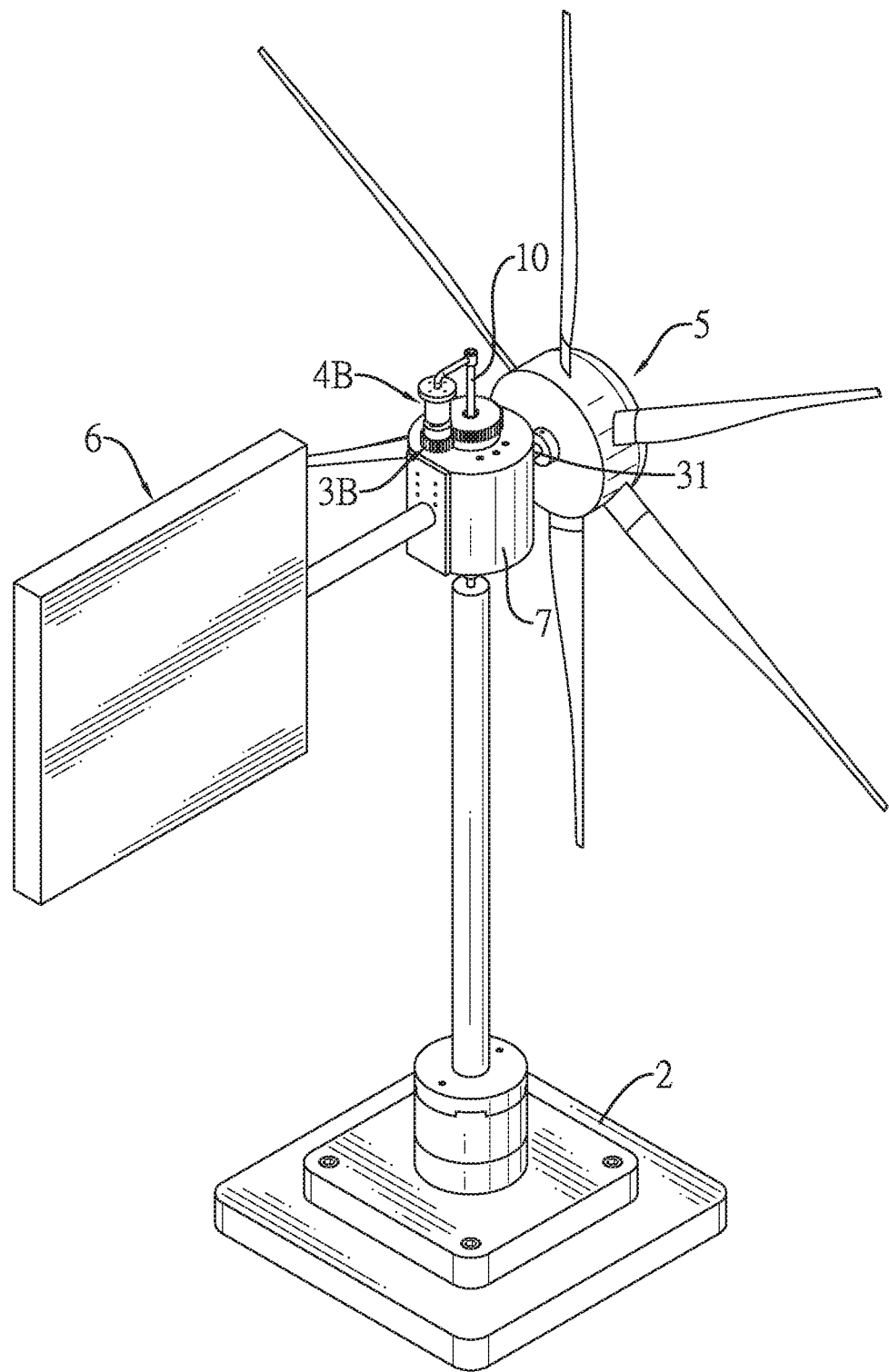
FIG. 9 is a perspective view of a second embodiment of a windward wind power generation mechanism in accordance with the present invention, showing the kinetic energy harvesting mechanism is the windward wind power generation mechanism.

With reference to FIGS. 5, 7, and 9, the fixing shaft 10 is connected to a seat 2. A bottom section of the second driving tube 421 of the second driving member 42 is extended out of a bottom of the rotating shell 20A and is in conjunction with a wheel driving assembly 3A to connect to the generating set 4A. The generating set 4A is located below the rotating shell 20A and is fixedly disposed on the fixing shaft 10. The wheel driving assembly 3A is a gear set or a pulley set.

Figure 6:
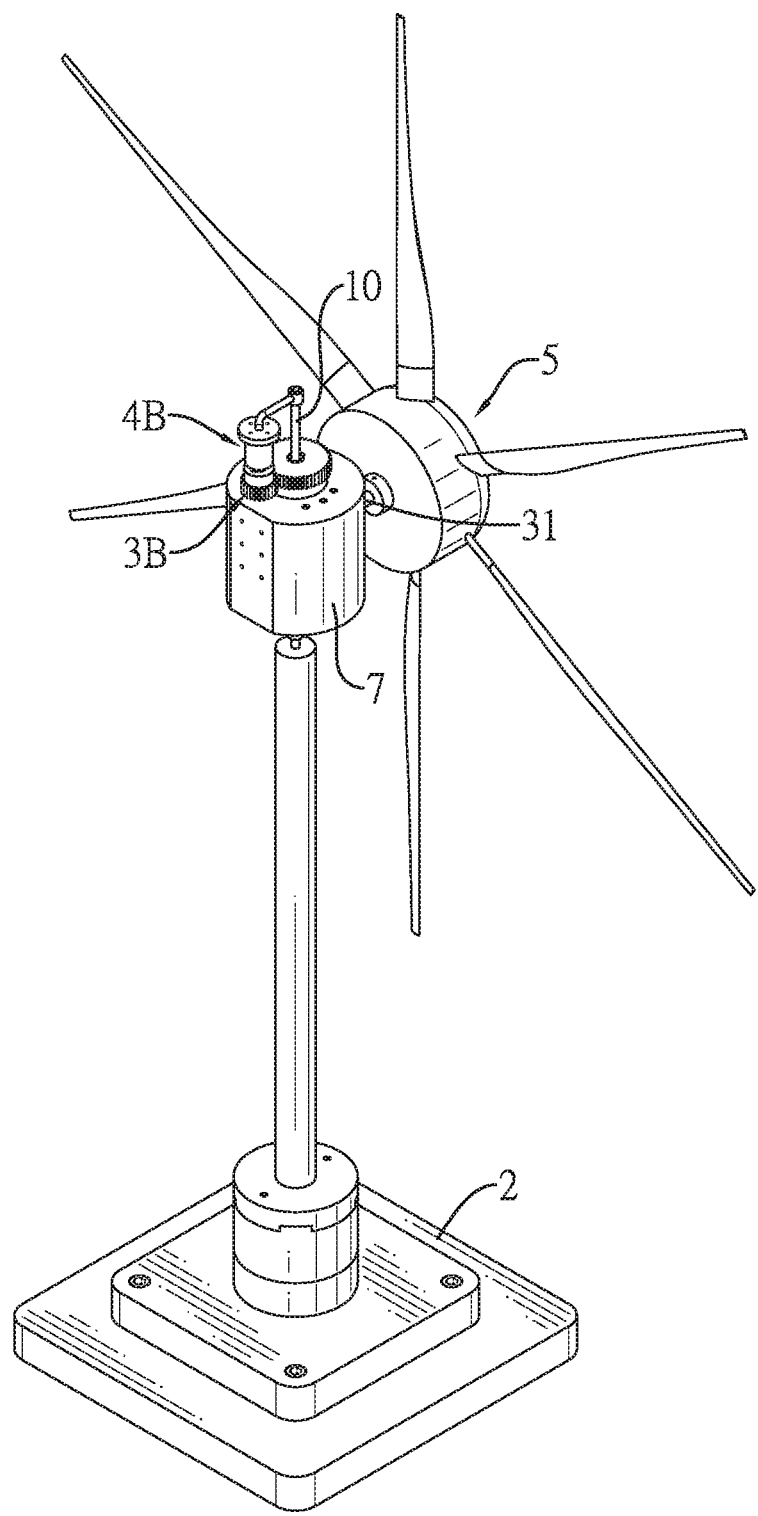
FIG. 6 is a perspective view of a second embodiment of a leeward wind power generation mechanism in accordance with the present invention, showing the kinetic energy harvesting mechanism is the leeward wind power generation mechanism.
Figure 10:
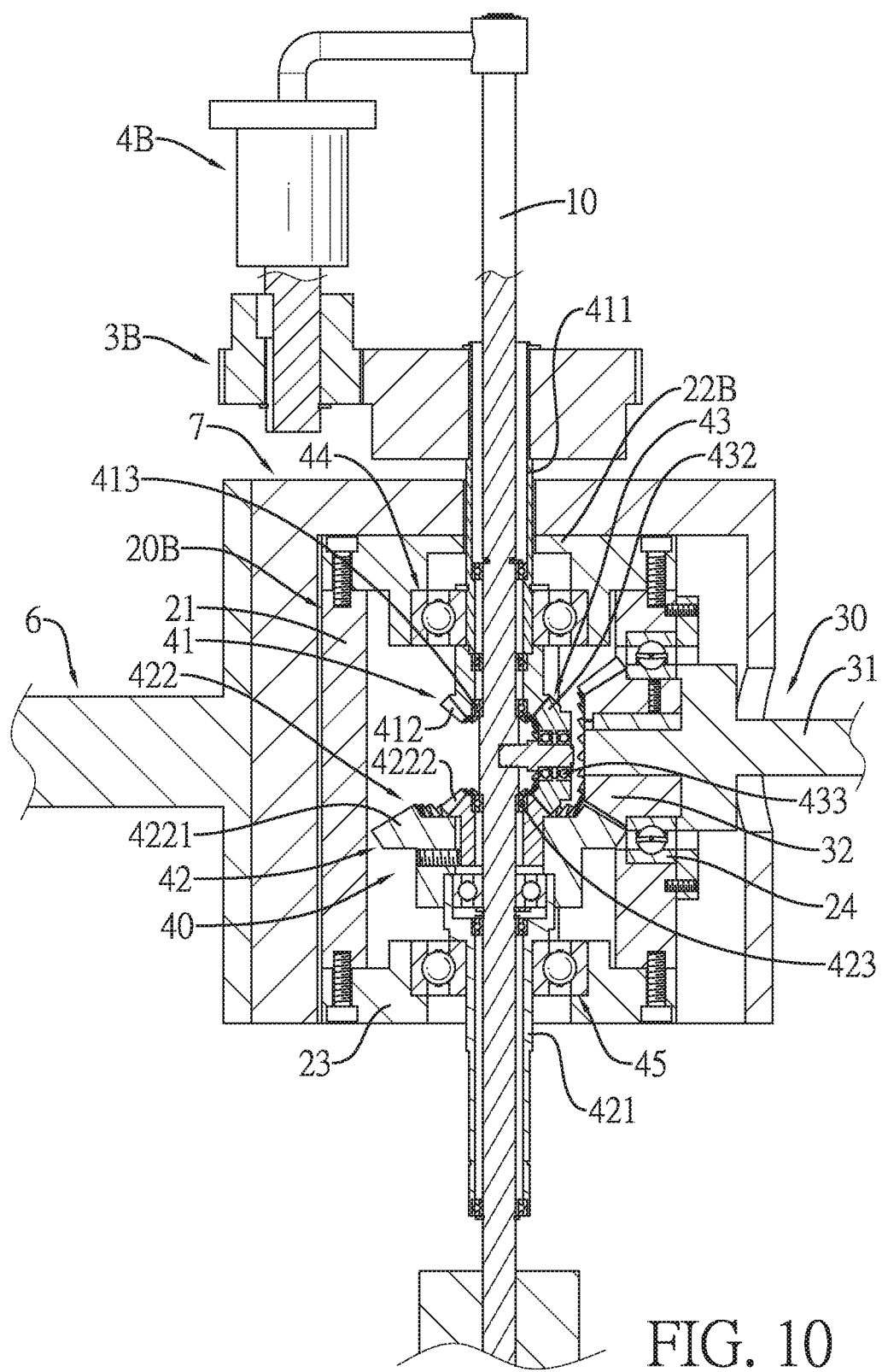
FIG. 10 is a side view in partial section of the kinetic energy harvesting mechanism being the windward wind power generation mechanism in FIG. 9.

With reference to FIGS. 6, 9, and 10, the fixing shaft 10 is connected to the seat 2. The first driving tube 411 of the first driving member 41 is extended out of a top of the rotating shell 20A, 20B and is in conjunction with the wheel driving assembly 3B to connect to the generating set 4B. The generating set 4B is located above the rotating shell 20A and is fixedly disposed on the fixing shaft 10. The wheel driving assembly 3B is a gear set or a pulley set.

Figure 11:
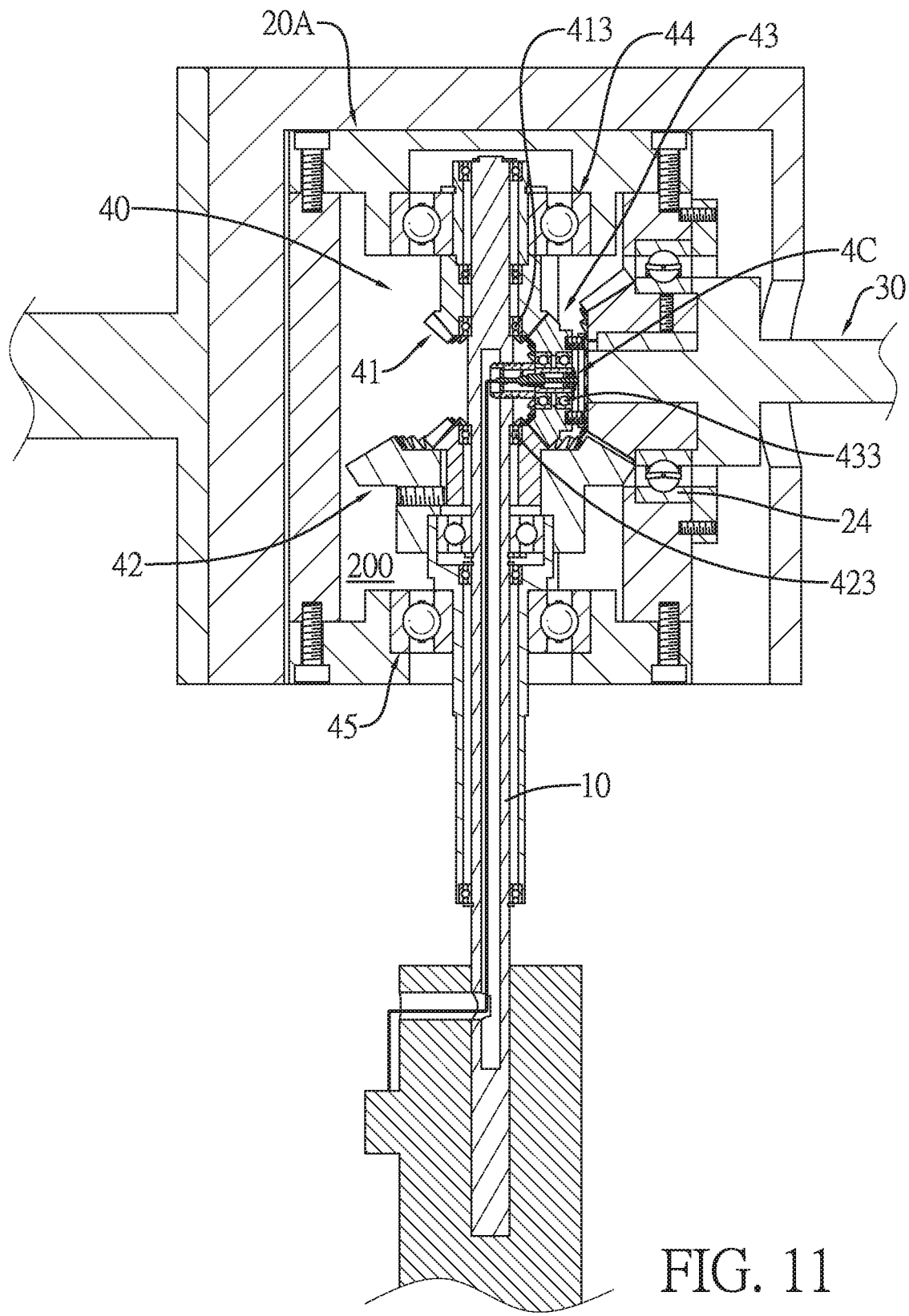
FIG. 11 is a side view in partial section of the kinetic energy harvesting mechanism in FIG. 4, showing the kinetic energy harvesting mechanism is a windward wind power generation mechanism.

With reference to FIGS. 4 and 11, the fixing shaft 10 is connected to the seat 2. The generating set 4C is disposed in the third driving member 43C. The generating set 4C has a stator 4C1 having a coil winding and a rotor 4C2. The stator 4C1 having the coil winding is disposed in the inner hole 433C of the inner shaft 431C. The rotor 4C2 is pivotally disposed in the stator 4C1 and is connected to the third driving wheel 432C. The external wire 4C3 is connected to the coil winding of the stator 4C1 and is inserted through the wire hole 101 of the fixing shaft 10 for extending.

Figure 8:
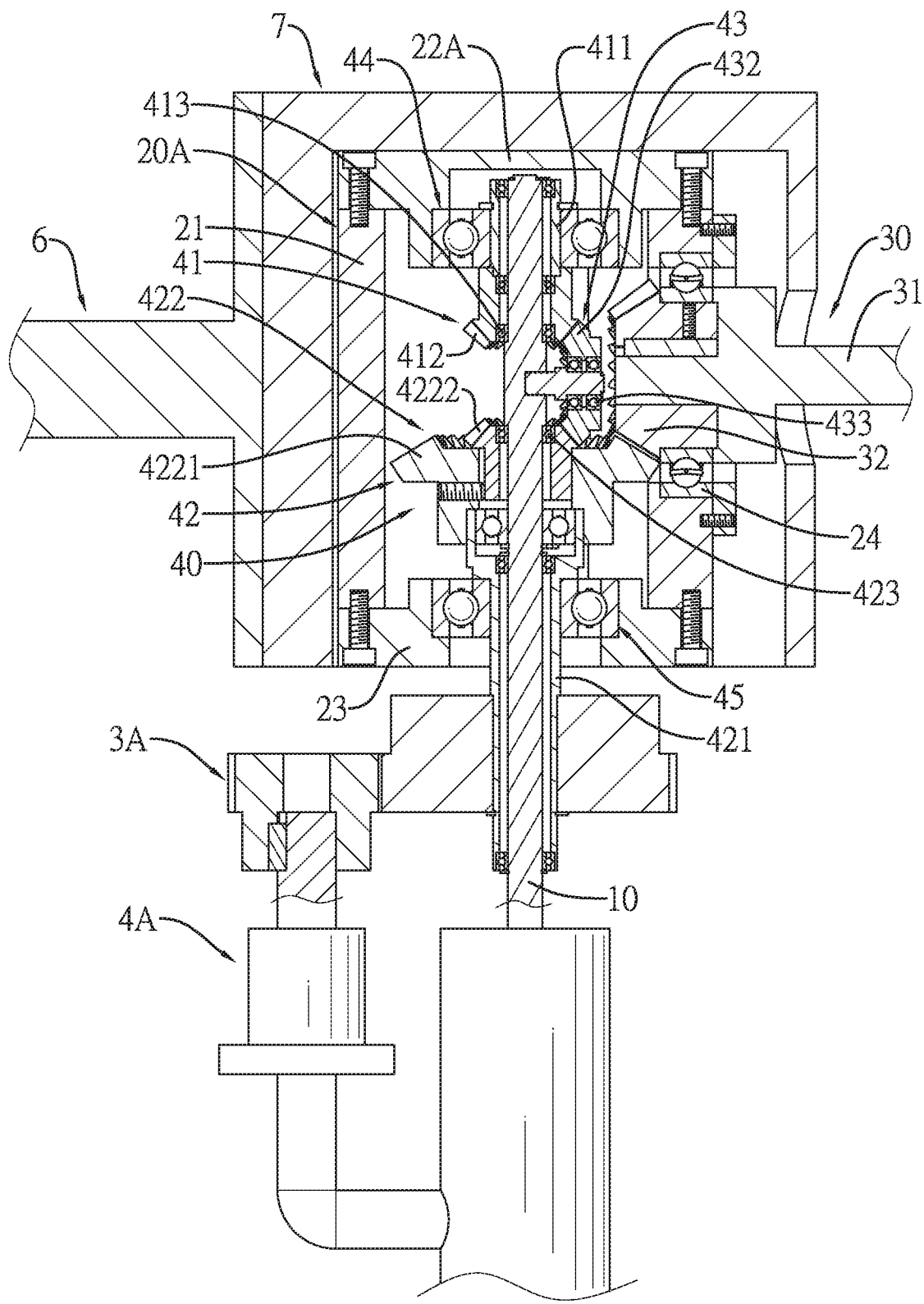
FIG. 8 is a side view in partial section of the kinetic energy harvesting mechanism being the windward wind power generation mechanism in FIG. 7.

With reference to FIGS. 5 to 11, an outer shell 7 is fixedly disposed around the rotating shell 20A, 20B by multiple screws. With reference to FIGS. 5, 7, and 8, the second driving tube 421 of the second driving member 42 is in conjunction with the wheel driving assembly 3A to connect to the generating set 4A. With reference to FIGS. 6, 9, and 10, the first driving tube 411 of the first driving member 41 is extended out of the top of the rotating shell 20A, 20B and a top of the outer shell 7 and is in conjunction with the wheel driving assembly 3B to connect to the generating set 4B.

With reference to FIGS. 5 and 6, an end of the rotating shaft 31 of the input member 30 extended out of the outer shell 7 is connected to an impeller 5. The impeller 5 has at least one blade. The kinetic energy harvesting mechanism is a leeward wind power generation mechanism. In addition, with reference to FIGS. 7 to 10, a tail 6 is connected to a side of the outer shell 7 opposite to the rotating shaft 31. The kinetic energy harvesting mechanism is a windward wind power generation mechanism.

The kinetic energy harvesting mechanism is applied as the wind power generation mechanism. With reference to FIGS. 5 to 11, the impeller 5 can capture the wind power for rotating and driving the generating set 4A to operate. The rotating shell 20A, 20B can be pushed by the wind power to turn or rotate. The kinetic energy harvesting mechanism can be assisted by the tail 6 connected to the rotating shell 20A, 20B for easily being pushed by the wind power to turn or rotate to achieve a chasing capability.

For facilitating motion states of the kinetic energy harvesting mechanism, the following is based on a first embodiment of the kinetic energy harvesting mechanism shown in FIGS. 7 and 8. The blades of the impeller 5 are driven only by the wind energy to rotate counterclockwise relative to the rotating shaft 31. The motion states of the kinetic energy harvesting mechanism are facilitated as follows.

Figure 12:
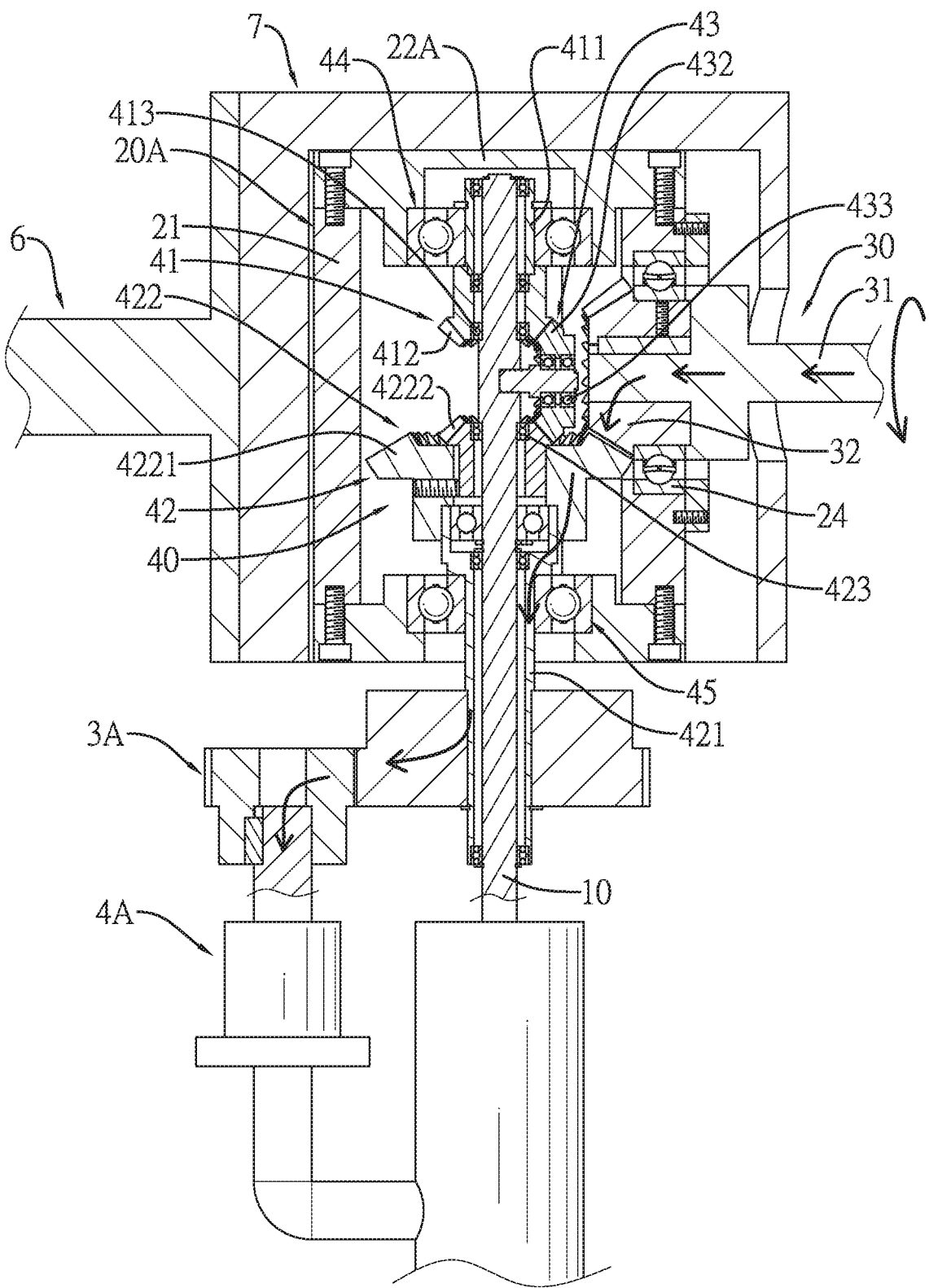
FIG. 12 is an operational side view in partial section of a first motion state of the kinetic energy harvesting mechanism being the windward wind power generation mechanism in FIGS. 8 and 9.
Figure 13:
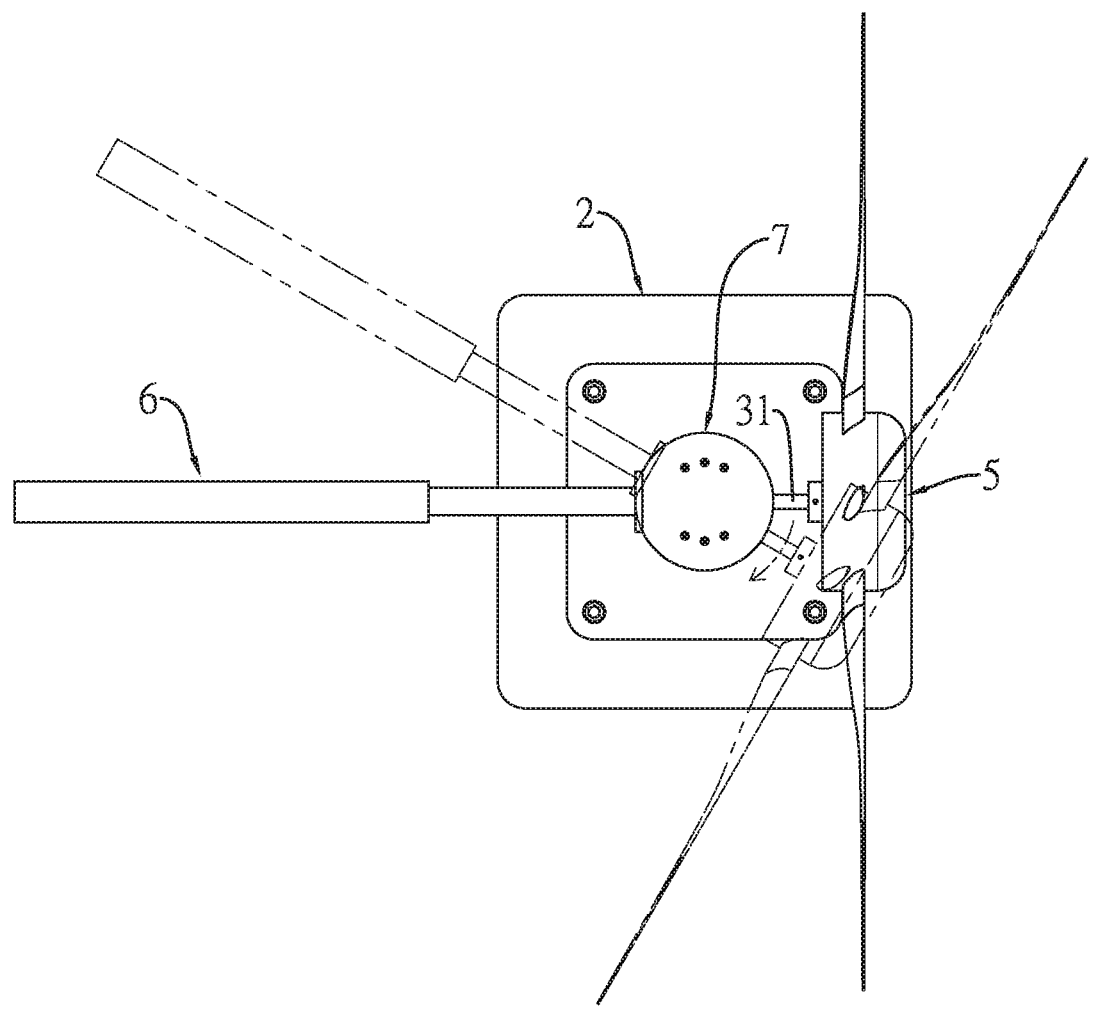
FIG. 13 is a top side view of a second motion state of the kinetic energy harvesting mechanism being the windward wind power generation mechanism in FIGS. 8 and 9.
Figure 14:
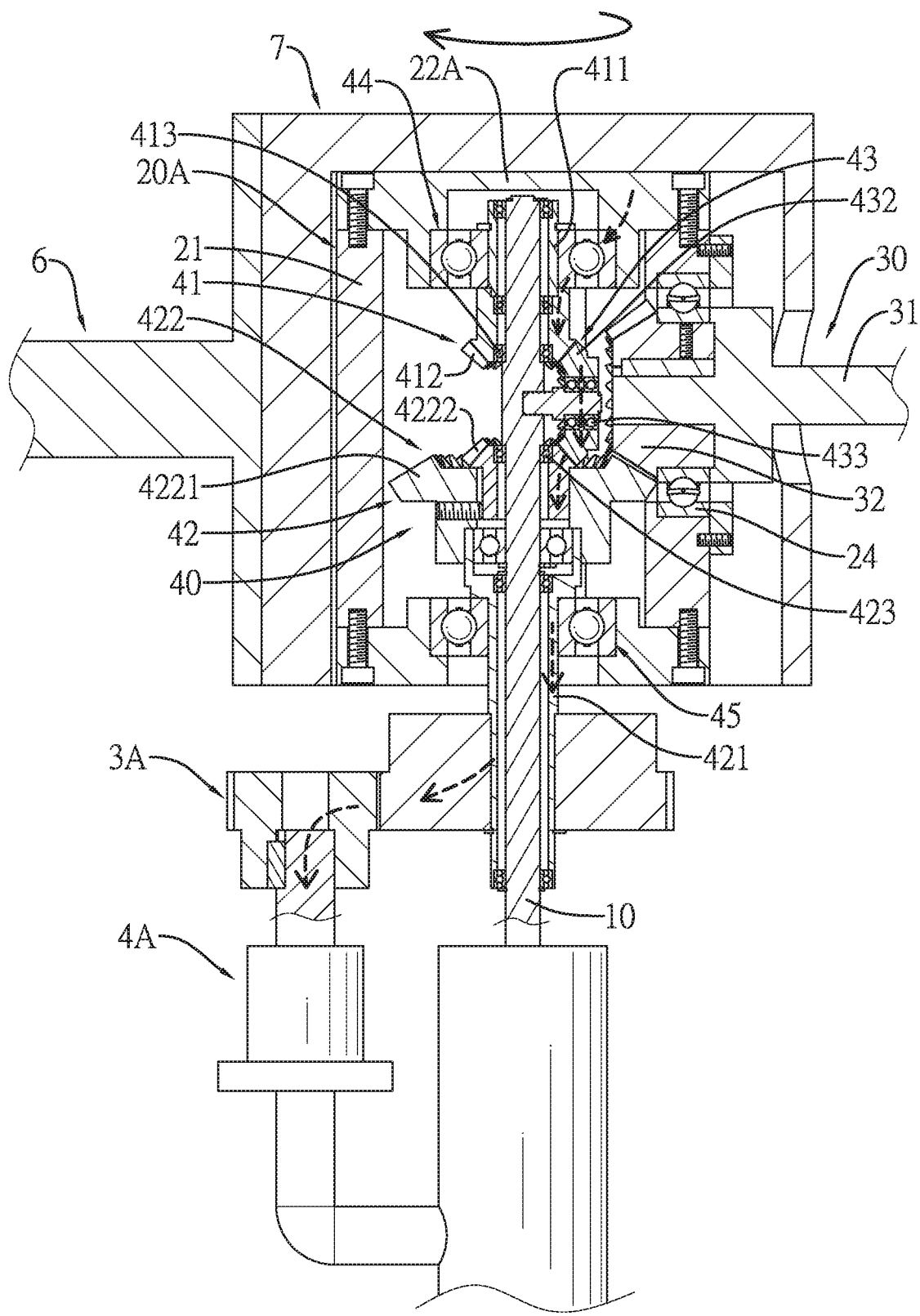
FIG. 14 is an operational side view in partial section of the second motion state of the kinetic energy harvesting mechanism being the windward wind power generation mechanism in FIGS. 8 and 9.
Figure 15:
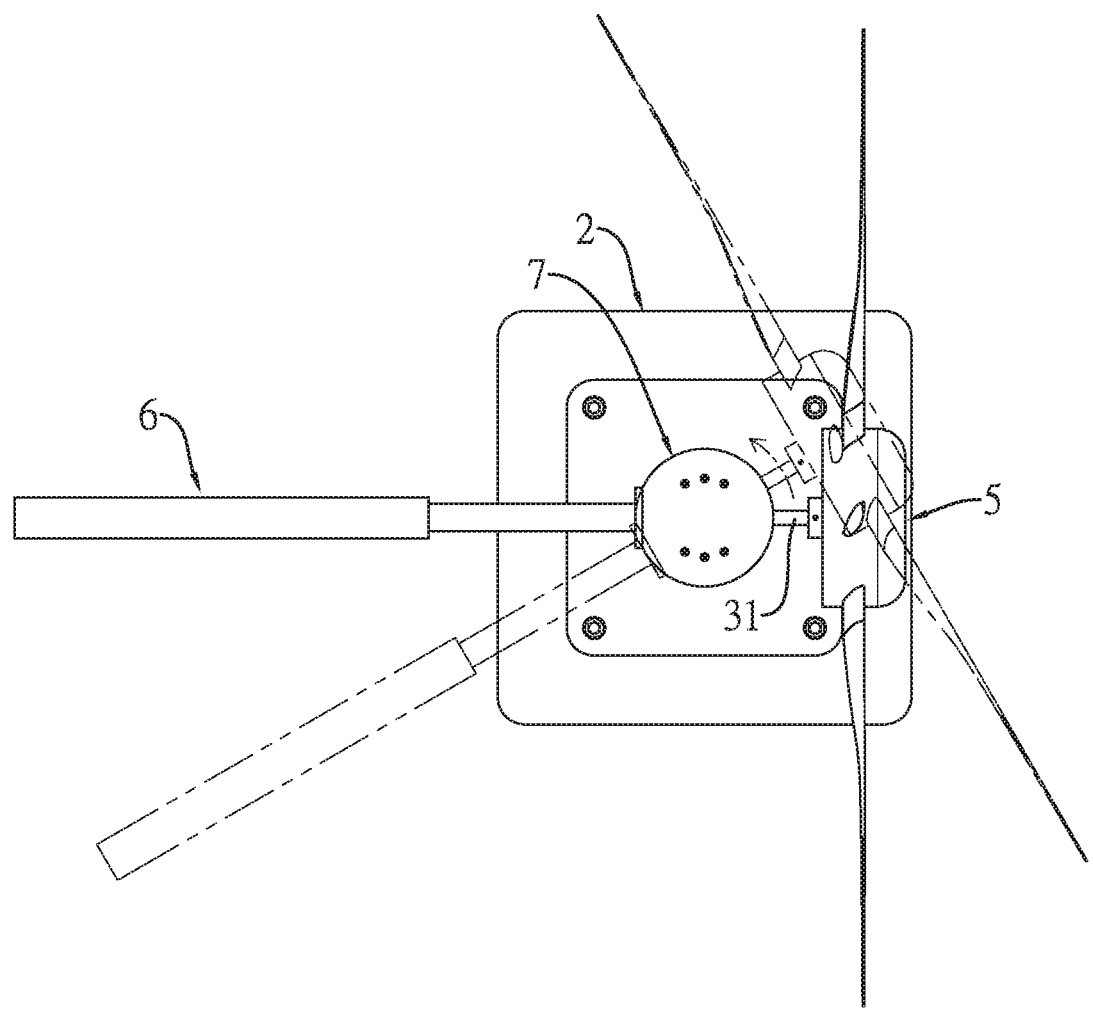
FIG. 15 is a top side view of a third motion state of the kinetic energy harvesting mechanism being the windward wind power generation mechanism in FIGS. 8 and 9.
Figure 16:
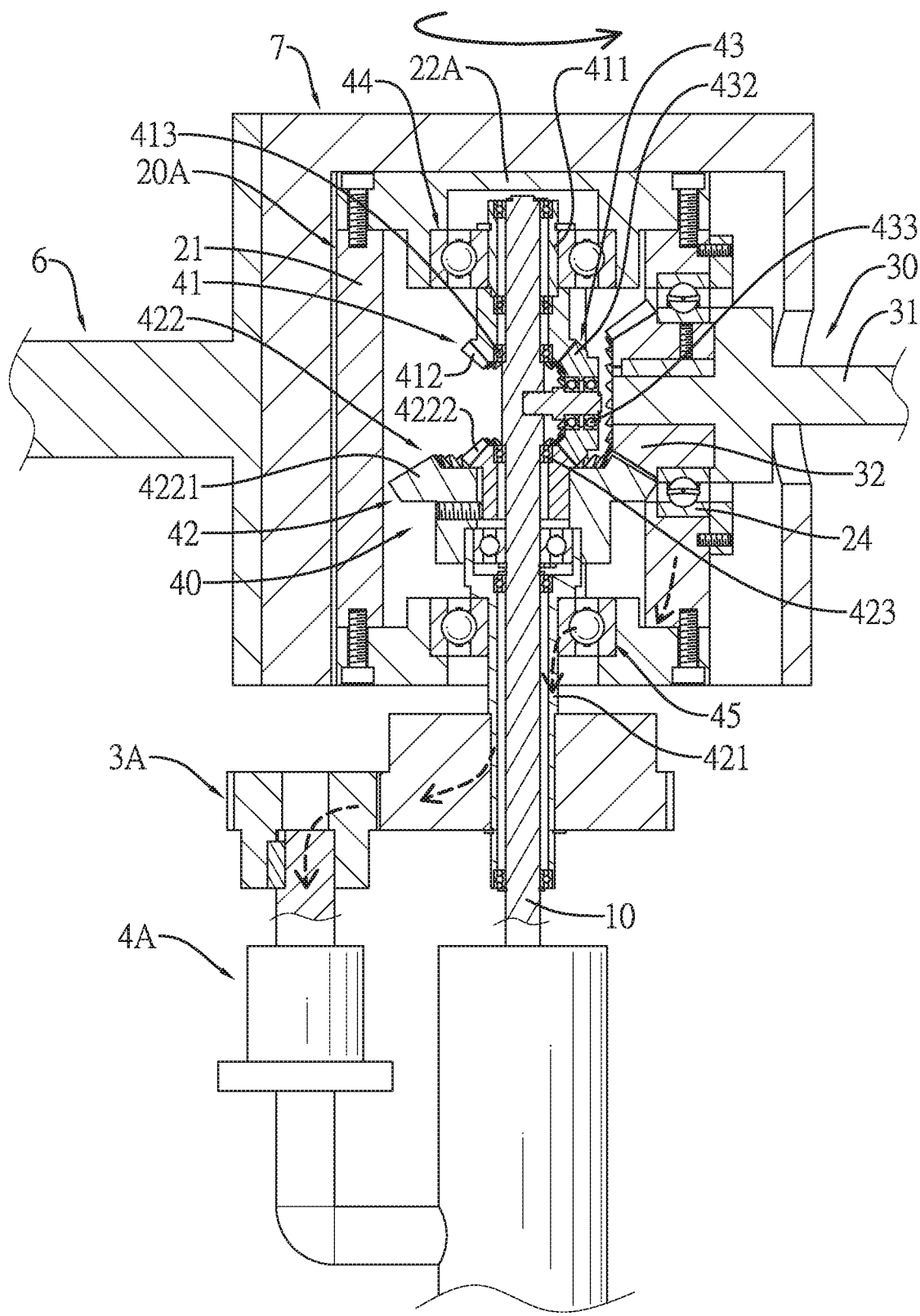
FIG. 16 is an operational side view in partial section of the third motion state of the kinetic energy harvesting mechanism being the windward wind power generation mechanism in FIGS. 8 and 9.

In a first motion state, the impeller 5 is rotated, and the rotating shell 20A is not rotated:

With reference to FIGS. 7, 8, and 12, when the impeller 5 faces the wind, the input member 30 is driven by the wind power captured by the impeller 5 to counterclockwise rotate. The input member 30 drives the first wheel portion 4221 of the second driving wheel 422 of the second driving member 42 by the rotating wheel 32 for driving the second driving member 42 to counterclockwise rotate. The second driving tube 421 of the second driving member 42 can output power to the wheel driving assembly 3A for driving the generating set 4A to operate.

In a second motion state, the impeller 5 is not rotated, and the rotating shell 20A is clockwise rotated in a top view of the kinetic energy harvesting mechanism.

With reference to FIGS. 7, 8, 13, and 14, the rotating shell 20A is pushed by a lateral wind power for clockwise rotating. The rotating shell 20A drives the first driving member 41 to rotate by the first one-way bearing 44 that can only be clockwise driven and the first driving tube 411 of the first driving member 41. The first driving wheel 412 of the first driving member 41, the third driving wheel 432 of the third driving member 43, and the second wheel portion 4222 of the second driving wheel 421 drive the second driving member 42 to counterclockwise rotate. The second driving member 42 outputs power to the wheel driving assembly 3A by the second driving tube 421 for driving the generating set 4A to operate.

In a third motion state, the impeller 5 is not rotated, and the rotating shell 20A is counterclockwise rotated.

With reference to FIGS. 7, 8, 15, and 16, the rotating shell 20A is pushed by the lateral wind power for counterclockwise rotating. The rotating shell 20A drives the second driving member 42 to rotate by the second one-way bearing 45 that can only be counterclockwise driven and the second driving tube 421 of the second driving member 41. The second driving member 42 is counterclockwise rotated and outputs power to the wheel driving assembly 3 by the second driving tube 421 for driving the generating set 4A to operate.

In a fourth motion state, the impeller 5 is rotated, and the rotating shell 20A is clockwise rotated.

Figure 17:
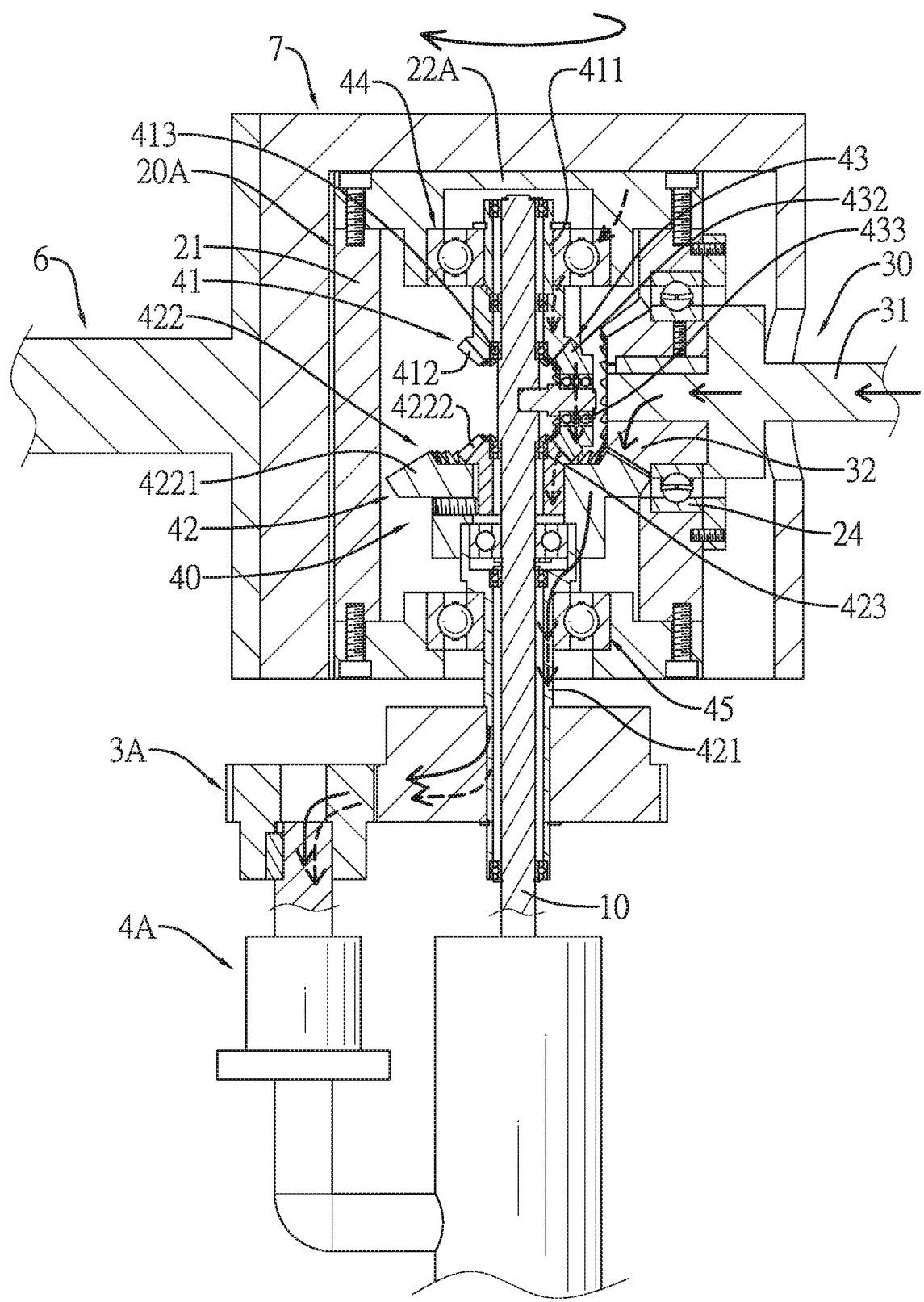
FIG. 17 is an operational side view in partial section of the fourth motion state of the kinetic energy harvesting mechanism being the windward wind power generation mechanism in FIGS. 8 and 9.

With reference to FIGS. 7, 8, and 17, the impeller 5 obtains the wind power and drives the rotating shaft 31 of the input member 30 to rotate. The rotating wheel 32 drives the second driving wheel 422 of the second driving member 42 for driving the second driving member 42 to counterclockwise rotate. The second driving tube 421 of the second driving member 42 drives the wheel driving assembly 3A for outputting the power to the wheel driving assembly 3A and driving the generating set 4A to operate.

On the other hand, the rotating shell 20A is clockwise rotated by the wind. The rotating shell 20A drives the first driving member 41 to clockwise rotate by the first one-way bearing 44 that can only be clockwise driven and the first driving tube 411 of the first driving member 41. The first driving wheel 412, the third driving wheel 432 of the third driving member 43, and the second wheel portion 4222 of the second driving wheel 421 drive the second driving member 42 to counterclockwise rotate. Therefore, the second driving member 42 outputs power to the wheel driving assembly 3A by the second driving tube 421 for driving the generating set 4A to operate.

In a fifth motion state, the impeller 5 is rotated, and the rotating shell 20A is counterclockwise rotated.

Figure 18:
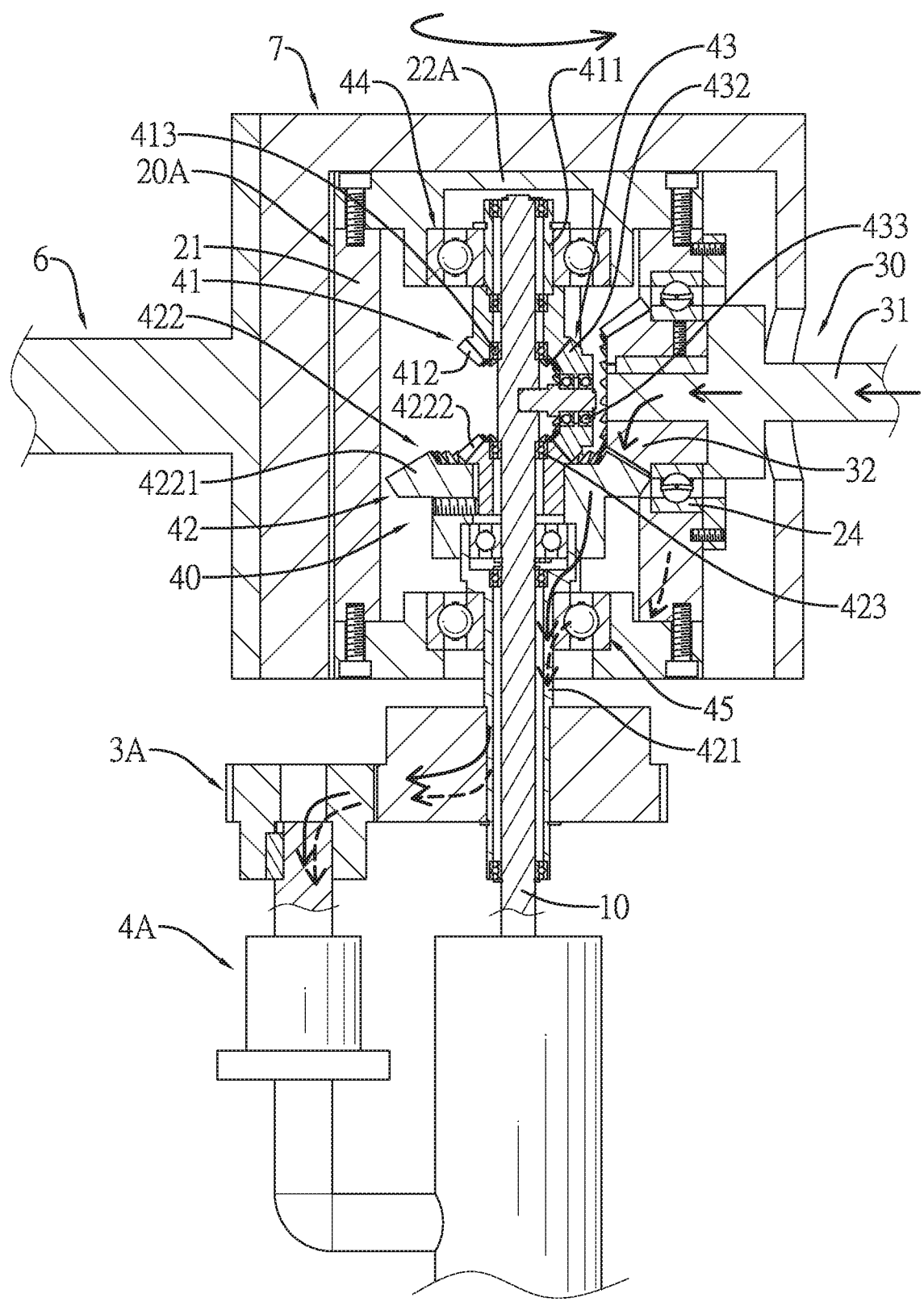
FIG. 18 is an operational side view in partial section of the fifth motion state of the kinetic energy harvesting mechanism being the windward wind power generation mechanism in FIGS. 8 and 9.

With reference to FIGS. 7, 8, and 18, the impeller 5 obtains the wind power and drives the rotating shaft 31 of the input member 30 to rotate. The second driving wheel 422 is driven for driving the second driving member 42 to counterclockwise rotate. The second driving tube 421 of the second driving member 42 drives the wheel driving assembly 3A for outputting the power to the wheel driving assembly 3A and driving the generating set 4A to operate. On the other hand, the rotating shell 20A is counterclockwise rotated by the wind. The second driving tube 421 of the second driving member 42 is driven by the second one-way bearing 45 to counterclockwise rotate. The wheel driving assembly 3A is driven to output power for driving the generating set 4A to operate.

Operating principles of the second embodiment and the third embodiment of the kinetic energy harvesting mechanism are same to an operating principle of the first embodiment of the kinetic energy harvesting mechanism. The difference in the first embodiment, the second embodiment, and the third embodiment of the kinetic energy harvesting mechanism is that an output power member is the first driving member 41 or the third driving member 43C. Motion states about the second embodiment and the third embodiment of the kinetic energy harvesting mechanism will not be described herein.

Accordingly, the kinetic energy harvesting mechanism uses six parts including the fixing shaft 10, the rotating shell 20A, 20B, the input member 30, the first driving member 41, the second driving member 42, and the third driving member 43. Two of the six parts are the input member 30 and the rotating shell 20A, 20B and are applied as the input parts of kinetic energy. The input member 30 is connected to one of the first driving member 41, the second driving member 42, and the third driving member 43 for transmitting movement. The third driving member 43 transmits movement between the first driving member 41 and the second driving member 42. One of the first driving member 41, the second driving member 42, and the third driving member 43 is applied as an output part of kinetic energy. The first driving member 41 is connected to the first one-way bearing 44 to be disposed in the rotating shell 20A, 20B. The second driving member 42 is connected to the second one-way bearing 45 to be disposed in the rotating shell 20A, 20B. The rotating driving direction of the second one-way bearing 45 is contrary to the rotating driving direction of the first one-way bearing 44. Unidirectional transmission functions of the first one-way bearing 44 and the second one-way bearing 45 are adverse to each other. The operation of the kinetic energy harvesting mechanism will not interfered by the first one-way bearing 44 and the second one-way bearing 45. The kinetic energy harvesting mechanism has five revolute pairs and three driving wheel pairs to form a biaxial kinetic energy harvesting mechanism having two degrees of freedom. A combination structure of the kinetic energy harvesting mechanism integrates biaxial input kinetic energy in a tandem way. The kinetic energy harvesting mechanism has a good capture property for capturing the unstable kinetic energy.

When the kinetic energy harvesting mechanism is applied as the wind power harvesting mechanism, the kinetic energy generated by the rotating shaft 31 rotating and the kinetic energy generated by the rotating shell 20A, 20B chasing are captured by the kinetic energy harvesting mechanism simultaneously. The kinetic energy harvesting mechanism has a structure having two degrees of freedom for having and integrating mechanical energy with vertical and horizontal biaxial inputs to a single axial direction continuously in rotation. Total wind power capturing capacity is increased. When the kinetic energy harvesting mechanism chases the wind, the rotating shell 20A, 20B can be clockwise or counterclockwise rotated by the wind. The rotating kinetic energy can be transmitted to the generating set 4A, 4B, 4C by the fixing shaft driving assembly 40.

In the kinetic energy harvesting mechanism, the rotating shaft 31 rotated continuously is axially connected to the fixing shaft 10 providing a supporting force. When the kinetic energy harvesting mechanism is applied as the wind power generation mechanism, the generating unit 4C can be disposed on the fixing shaft 10 without a brush or a rotating connecter for reducing a moment of inertia in chasing time, reducing the cost, increasing the service life, and keeping the electrical energy transmission efficiency. The installation site can be close to the Earth's surface, the city, and disorderly wind field for capturing a lot of the kinetic energy. The kinetic energy harvesting mechanism is the wind power harvesting mechanism being innovative and having industrial applicability.

What is claimed is:

1. A kinetic energy harvesting mechanism comprising:
a fixing shaft disposed uprightly;
a rotating shell being hollow and disposed on the fixing shaft, wherein the rotating shell is able to rotate relative to the fixing shaft;
an input member pivotally disposed in the rotating shell and axially connected to the fixing shaft; and
a fixing shaft driving assembly disposed in the rotating shell and having
a first one-way bearing disposed in the rotating shell;
a second one-way bearing disposed in the rotating shell, wherein a rotating driving direction of the second one-way bearing is contrary to a rotating driving direction of the first one-way bearing;
a first driving member connected to the first one-way bearing to be disposed in the rotating shell, wherein the fixing shaft is inserted through the first driving member, the rotating shell drives the first driving member by the first one-way bearing, and the first driving member is rotated in a rotating direction of the fixing shaft;
a second driving member connected to the second one-way bearing to be disposed in the rotating shell, and coaxially disposed with the first driving member at a spaced interval, wherein the fixing shaft is inserted through the second driving member, the rotating shell drives the second driving member by the second one-way bearing, the second driving member is rotated in the rotating direction of the fixing shaft, and the rotating direction of the second driving member is contrary to the rotating direction of the first driving member;
a third driving member disposed in the rotating shell, and connected to the first driving member and the second driving member;
wherein one of the first driving member, the second driving member, and the third driving member is connected to the input member, and the input member drives the first driving member, the second driving member, and the third driving member to move simultaneously; wherein
the input member has a rotating shaft and a rotating wheel, the rotating shaft is pivotally disposed in the rotating shell, an axial direction of the rotating shaft intersects with an axial direction of the fixing shaft, the rotating shaft is rotated in the rotating shell, the rotating shaft follows the rotating shell to rotate around the fixing shaft, and the rotating wheel is located in the rotating shell and is fixedly connected to an end of the rotating shaft;
the first driving member has a first driving wheel located in the rotating shell and disposed around the fixing shaft;
the second driving member has a second driving wheel, the second driving wheel is located in the rotating shell, is opposite to the first driving wheel, is disposed around the fixing shaft, and has a first wheel portion and a second wheel portion, the first wheel portion is connected to the rotating wheel of the input member, and the second wheel portion is located in and is coaxially connected to the first wheel portion; and
the third driving member has an inner shaft and a third driving wheel, the inner shaft is horizontally disposed on the fixing shaft, an axial direction of the inner shaft intersects with the axial direction of the fixing shaft, and the third driving wheel is disposed on an end of the inner shaft, is located out of the fixing shaft, and is connected to the first driving wheel and the second wheel portion of the second driving wheel for transmitting movement.

2. The kinetic energy harvesting mechanism as claimed in claim 1, wherein the fixing shaft is connected to a seat, a first driving tube of the first driving member is extended out of a top surface of the rotating shell and is in conjunction with a wheel driving assembly to connect to a generating set.

3. The kinetic energy harvesting mechanism as claimed in claim 2, wherein
the rotating shell has a surrounding wall, a chamber, a top plate, a bottom plate, a side hole, a bottom hole, and a top hole, the surrounding wall is disposed around the fixing shaft and has a top edge, a bottom edge, and a side surface, the chamber is formed in the surrounding wall, the top plate is disposed on the top edge of the surrounding wall, the bottom plate is disposed on the bottom edge of the surrounding wall, the side hole is formed on the side surface of the surrounding wall and is in communication with the chamber, the bottom hole is formed on a center of the bottom plate and is in communication with the chamber, and the top hole is formed on a center of the top plate and is in communication with the chamber;
the fixing shaft is inserted into the chamber via the bottom hole on the bottom plate;
the rotating shaft is pivotally disposed in the side hole on the surrounding wall;
the first driving member is in conjunction with the first one-way bearing to be disposed in the top hole on the top plate; and
the second driving member is in conjunction with the second one-way bearing to be disposed in the bottom hole on the bottom plate.

4. The kinetic energy harvesting mechanism as claimed in claim 2, wherein the rotating shaft of the input member is connected to an impeller.

5. The kinetic energy harvesting mechanism as claimed in claim 2, wherein the rotating shaft of the input member is connected to an impeller, and a tail is connected to a side of the surrounding wall opposite to the rotating shaft.

6. The kinetic energy harvesting mechanism as claimed in claim 2, wherein an outer shell is fixedly disposed around the rotating shell, and the rotating shaft of the input member is extended out of the outer shell to connect to an impeller.

7. The kinetic energy harvesting mechanism as claimed in claim 2, wherein an outer shell is fixedly disposed around the rotating shell, the rotating shaft of the input member is extended out of the outer shell to connect to an impeller, and a tail is connected to a side of the outer shell opposite to the rotating shaft.

8. The kinetic energy harvesting mechanism as claimed in claim 1, wherein the fixing shaft is connected to a seat, a second driving tube of the second driving member is in conjunction with a wheel driving assembly to connect to a generating set.

9. The kinetic energy harvesting mechanism as claimed in claim 8, wherein
the rotating shell has a surrounding wall, a chamber, a top plate, a bottom plate, a side hole, a bottom hole, and a top hole, the surrounding wall is disposed around the fixing shaft and has a top edge, a bottom edge, and a side surface, the chamber is formed in the surrounding wall, the top plate is disposed on the top edge of the surrounding wall, the bottom plate is disposed on the bottom edge of the surrounding wall, the side hole is formed on the side surface of the surrounding wall and is in communication with the chamber, the bottom hole is formed on a center of the bottom plate and is in communication with the chamber, and the top hole is formed on a center of the top plate and is in communication with the chamber;

the fixing shaft is inserted into the chamber via the bottom hole on the bottom plate;

the rotating shaft is pivotally disposed in the side hole on the surrounding wall;

the first driving member is in conjunction with the first one-way bearing to be disposed in the top hole on the top plate; and the second driving member is in conjunction with the second one-way bearing to be disposed in the bottom hole on the bottom plate.

10. The kinetic energy harvesting mechanism as claimed in claim 8, wherein the rotating shaft of the input member is connected to an impeller.

11. The kinetic energy harvesting mechanism as claimed in claim 8, wherein the rotating shaft of the input member is connected to an impeller, and a tail is connected to a side of the surrounding wall opposite to the rotating shaft.

12. The kinetic energy harvesting mechanism as claimed in claim 8, wherein an outer shell is fixedly disposed around the rotating shell, and the rotating shaft of the input member is extended out of the outer shell to connect to an impeller.

13. The kinetic energy harvesting mechanism as claimed in claim 8, wherein an outer shell is fixedly disposed around the rotating shell, the rotating shaft of the input member is extended out of the outer shell to connect to an impeller, and a tail is connected to a side of the outer shell opposite to the rotating shaft.

14. The kinetic energy harvesting mechanism as claimed in claim 1, wherein the fixing shaft is connected to a seat, an inner hole is axially formed through the inner shaft of the third driving member, the fixing shaft has a wire hole, the wire hole is formed in the fixing shaft, is in communication with the inner hole, and extends to an outer surface of the fixing shaft, a generating set is disposed in the third driving member and has a stator and a rotor, the stator is disposed in the inner shaft, the rotor is disposed in the third driving wheel, and an external wire of the generating set is inserted into and out of the wire hole of the fixing shaft.

15. The kinetic energy harvesting mechanism as claimed in claim 14, wherein
the rotating shell has a surrounding wall, a chamber, a top plate, a bottom plate, a side hole, a bottom hole, and a top hole, the surrounding wall is disposed around the fixing shaft and has a top edge, a bottom edge, and a side surface, the chamber is formed in the surrounding wall, the top plate is disposed on the top edge of the surrounding wall, the bottom plate is disposed on the bottom edge of the surrounding wall, the side hole is formed on the side surface of the surrounding wall and is in communication with the chamber, the bottom hole is formed on a center of the bottom plate and is in communication with the chamber, and the top hole is formed on a center of the top plate and is in communication with the chamber;

the fixing shaft is inserted into the chamber via the bottom hole on the bottom plate;

the rotating shaft is pivotally disposed in the side hole on the surrounding wall;

the first driving member is in conjunction with the first one-way bearing to be disposed in the top hole on the top plate; and the second driving member is in conjunction with the second one-way bearing to be disposed in the bottom hole on the bottom plate.

16. The kinetic energy harvesting mechanism as claimed in claim 15, wherein
the first driving member has a first driving tube, the first driving tube is in conjunction with the first one-way bearing to be disposed in the top hole on the top plate, the first driving wheel is fixedly disposed on an end of the first driving tube, and the fixing shaft is inserted through the first driving tube and the first driving wheel; and the second driving member has a second driving tube, the second driving tube is in conjunction with the second one-way bearing to be disposed in the bottom hole on the bottom plate, the second driving wheel is fixedly disposed on an end of the second driving tube, and the fixing shaft is inserted through the second driving tube and the second driving wheel.

17. The kinetic energy harvesting mechanism as claimed in claim 16, wherein
the rotating wheel of the input member, the first driving wheel, the first wheel portion and the second wheel portion of the second driving wheel, and the third driving member are all bevel gears or friction wheels;

at least one first bearing is disposed between the fixing shaft and the first driving member;

at least one second bearing is disposed between the fixing shaft and the second driving member;

at least one third bearing is disposed between the third driving wheel and the inner shaft; and at least one fourth bearing is disposed between a wall adjacent to the side hole and the rotating shaft.

18. The kinetic energy harvesting mechanism as claimed in claim 14, wherein the rotating shaft of the input member is connected to an impeller.

19. The kinetic energy harvesting mechanism as claimed in claim 14, wherein the rotating shaft of the input member is connected to an impeller, and a tail is connected to a side of the surrounding wall opposite to the rotating shaft.

20. The kinetic energy harvesting mechanism as claimed in claim 14, wherein an outer shell is fixedly disposed around the rotating shell, and the rotating shaft of the input member is extended out of the outer shell to connect to an impeller.

21. The kinetic energy harvesting mechanism as claimed in claim 14, wherein an outer shell is fixedly disposed around the rotating shell, the rotating shaft of the input member is extended out of the outer shell to connect to an impeller, and a tail is connected to a side of the outer shell opposite to the rotating shaft.

22. The kinetic energy harvesting mechanism as claimed in claim 1, wherein
the rotating shell has a surrounding wall, a chamber, a top plate, a bottom plate, a side hole, a bottom hole, and a top hole, the surrounding wall is disposed around the fixing shaft and has a top edge, a bottom edge, and a side surface, the chamber is formed in the surrounding wall, the top plate is disposed on the top edge of the surrounding wall, the bottom plate is disposed on the bottom edge of the surrounding wall, the side hole is formed on the side surface of the surrounding wall and is in communication with the chamber, the bottom hole is formed on a center of the bottom plate and is in communication with the chamber, and the top hole is formed on a center of the top plate and is in communication with the chamber;

the fixing shaft is inserted into the chamber via the bottom hole on the bottom plate;

the rotating shaft is pivotally disposed in the side hole on the surrounding wall;

the first driving member is in conjunction with the first one-way bearing to be disposed in the top hole on the top plate; and the second driving member is in conjunction with the second one-way bearing to be disposed in the bottom hole on the bottom plate.

23. The kinetic energy harvesting mechanism as claimed in claim 22, wherein the first driving member has a first driving tube, the first driving tube is in conjunction with the first one-way bearing to be disposed in the top hole on the top plate, the first driving wheel is fixedly disposed on an end of the first driving tube, and the fixing shaft is inserted through the first driving tube and the first driving wheel; and the second driving member has a second driving tube, the second driving tube is in conjunction with the second one-way bearing to be disposed in the bottom hole on the bottom plate, the second driving wheel is fixedly disposed on an end of the second driving tube, and the fixing shaft is inserted through the second driving tube and the second driving wheel.

24. The kinetic energy harvesting mechanism as claimed in claim 23, wherein the rotating wheel of the input member, the first driving wheel, the first wheel portion and the second wheel portion of the second driving wheel, and the third driving member are all bevel gears or friction wheels;

at least one first bearing is disposed between the fixing shaft and the first driving member;

at least one second bearing is disposed between the fixing shaft and the second driving member;

at least one third bearing is disposed between the third driving wheel and the inner shaft; and at least one fourth bearing is disposed between a wall adjacent to the side hole and the rotating shaft.

25. The kinetic energy harvesting mechanism as claimed in claim 1, wherein the rotating shaft of the input member is connected to an impeller.

26. The kinetic energy harvesting mechanism as claimed in claim 1, wherein the rotating shaft of the input member is connected to an impeller, and a tail is connected to a side of the surrounding wall opposite to the rotating shaft.

27. The kinetic energy harvesting mechanism as claimed in claim 1, wherein an outer shell is fixedly disposed around the rotating shell, and the rotating shaft of the input member is extended out of the outer shell to connect to an impeller.

28. The kinetic energy harvesting mechanism as claimed in claim 1, wherein an outer shell is fixedly disposed around the rotating shell, the rotating shaft of the input member is extended out of the outer shell to connect to an impeller, and a tail is connected to a side of the outer shell opposite to the rotating shaft.

* * * * *